(12) United States Patent
Kaneko

(10) Patent No.: US 8,730,667 B2
(45) Date of Patent: May 20, 2014

(54) PROTECTION COVER, ELECTRONIC DEVICE AND COVER HOLDING STRUCTURE

(75) Inventor: Haruka Kaneko, Kyoto (JP)

(73) Assignee: Panasonic Corporation, Osaka (JP)

( * ) Notice: Subject to any disclaimer, the term of this patent is extended or adjusted under 35 U.S.C. 154(b) by 77 days.

(21) Appl. No.: 13/248,655

(22) Filed: Sep. 29, 2011

(65) Prior Publication Data

US 2012/0081876 A1 Apr. 5, 2012

(30) Foreign Application Priority Data

Sep. 30, 2010 (JP) .................................. 2010-221632
Sep. 30, 2010 (JP) .................................. 2010-221633

(51) Int. Cl.
*G06F 1/16* (2006.01)

(52) U.S. Cl.
USPC ............ 361/679.55; 361/679.56; 361/679.57; 361/725; 206/320

(58) Field of Classification Search
USPC .......................................... 361/802; 224/605
See application file for complete search history.

(56) References Cited

U.S. PATENT DOCUMENTS

| | | | | |
|---|---|---|---|---|
| 5,632,373 A | * | 5/1997 | Kumar et al. ................ | 206/305 |
| 5,835,344 A | * | 11/1998 | Alexander ............... | 361/679.46 |
| 5,992,155 A | * | 11/1999 | Kobayashi et al. ............... | 62/3.7 |
| 6,196,758 B1 | * | 3/2001 | Scarborough ................. | 403/353 |
| 6,324,055 B1 | | 11/2001 | Kawabe | |
| 7,573,710 B2 | * | 8/2009 | Morino et al. ........... | 361/679.55 |
| 2001/0000447 A1 | * | 4/2001 | Thompson .................... | 361/686 |
| 2001/0009500 A1 | * | 7/2001 | Selker ........................ | 361/683 |
| 2002/0179470 A1 | * | 12/2002 | Lee ............................. | 206/320 |
| 2005/0078444 A1 | * | 4/2005 | Hong .......................... | 361/683 |
| 2005/0200608 A1 | * | 9/2005 | Ulla et al. .................... | 345/168 |
| 2008/0030939 A1 | * | 2/2008 | Gillespie et al. ............. | 361/681 |
| 2008/0084659 A1 | * | 4/2008 | Misawa ....................... | 361/681 |
| 2008/0192408 A1 | * | 8/2008 | Edward et al. ............... | 361/600 |
| 2008/0192418 A1 | * | 8/2008 | Zambelli et al. ............. | 361/681 |
| 2010/0044259 A1 | * | 2/2010 | Wang .......................... | 206/320 |
| 2010/0122924 A1 | * | 5/2010 | Andrews ...................... | 206/320 |

FOREIGN PATENT DOCUMENTS

| | | |
|---|---|---|
| JP | 2000-010661 | 1/2000 |
| JP | 2000-259574 | 9/2000 |
| JP | 2003-273985 | 9/2003 |

* cited by examiner

*Primary Examiner* — Tuan T Dinh
*Assistant Examiner* — Steven T Sawyer
(74) *Attorney, Agent, or Firm* — Hamre, Schumann, Mueller & Larson, P.C.

(57) ABSTRACT

A first coupling member 20 can be engaged with a first engagement hole 2*e* and held slidably by a first support member 12. A second coupling member 30 of the present embodiment can be engaged with a second engagement hole 2*f* and held slidably by a second support member 13. With this configuration, a relative position between a second housing 2 and a protection cover 10 changes at the time of turning the second housing 2 in a direction indicated by an arrow A or B, which can prevent the protection cover 10 from loosening significantly near the hinge portions 3.

7 Claims, 22 Drawing Sheets

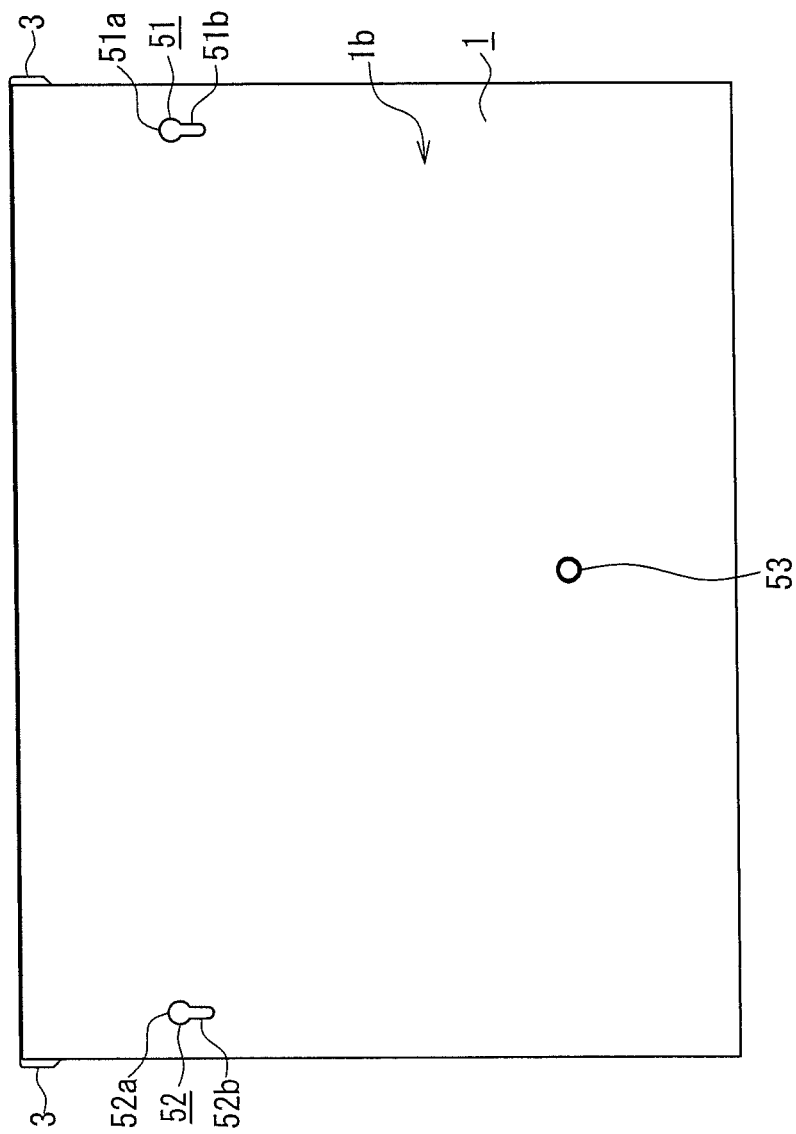

PROTECTION COVER, ELECTRONIC DEVICE AND COVER HOLDING STRUCTURE

BACKGROUND

1. Field

The present application relates to a protection cover attachable/detachable to an electronic device. The present application relates to an electronic device to which the protection cover is attachable/detachable. The present application relates to a cover holding structure capable of holding the protection cover with respect to the electronic device.

2. Description of Related Art

Portable electronic devices such as notebook computers have advantages in portability, yet may be dropped on the floor or the like during transit. If a notebook computer is dropped on the floor, the computer may be damaged due to an impact at the time of the collision with the floor. For reducing such a damage of the notebook computer, protection covers that are attachable/detachable to an outer frame of the notebook computer have been brought to the market.

JP 2000-259574 A discloses a carrying case for protecting a portable information terminal device from disturbances, such as an impact, by covering the portable information terminal device.

However, in the configuration disclosed in JP 2000-259574 A, since a case body is attached to the portable information terminal device only at the vicinity of an end portion of the device using a hook-and-loop fastener, a part not covered by the case body in the device increases when the device to which the case body is attached is used while being grasped by a hand. This prevents sufficient protection against disturbances such as an impact.

Further, in the configuration disclosed in JP 2000-10661 A, since a cover is fixed to a main body portion and a display portion, the cover loosens significantly in a part between the main body portion and the display portion when the information processor is open. With such a loose cover, the orientation of the information processor becomes unstable when a user operates the processor while placing the main body side on his/her palm, which increases the possibility of dropping the processor mistakenly on the floor, etc. Further, if the cover loosens, the loose part in the cover deteriorates quickly.

SUMMARY

A protection cover disclosed in the present application is a protection cover that covers at least a part of an electronic device having a first housing and a second housing that are supported turnably to each other, including: a main body portion having a size capable of covering the first housing and the second housing; a fixing member provided in the main body portion and capable of being fixed to the first housing; and a locking member provided in the main body portion and capable of being locked to the second housing. The locking member is locked to the second housing such that a relative position between the main body portion and the second housing is changeable.

An electronic device disclosed in the present application is an electronic device that has a first housing and a second housing supported turnably to each other and is capable of holding a protection cover, including: a hole formed in the first housing and capable of accepting a protrusion portion provided in the protection cover, wherein the hole includes a first hole having a first inner diameter and a second hole having a second inner diameter that is smaller than the first inner diameter. The first inner diameter is larger than the second inner diameter and an outer diameter of a tip end portion of the protrusion portion, and the second inner diameter is smaller than an outer diameter of a shaft portion of the protrusion portion that is smaller than the outer diameter of the tip end portion.

A cover holding structure disclosed in the present application is a cover holding structure that is capable of holding a protection cover to an electronic device having a housing, wherein the housing includes a hole, and the protection cover includes a protrusion portion capable of being fitted in the hole. The hole includes a first hole having a first inner diameter and a second hole having a second inner diameter that is smaller than the first inner diameter. The protrusion portion includes a shaft portion whose one end portion is connected to a main body portion of the protection cover and a tip end portion that is connected to the other end portion of the shaft portion. An outer diameter of the tip end portion is smaller than the first inner diameter and larger than the second inner diameter, and an outer diameter of the shaft portion is smaller than the second inner diameter and smaller than the outer diameter of the tip end portion.

BRIEF DESCRIPTION OF THE DRAWINGS

FIG. 7A is a plan view of a lower face of a first housing.

DETAILED DESCRIPTION OF THE EMBODIMENTS (Embodiment)

[1. Outline of the Overall Configuration]

Figure 1:
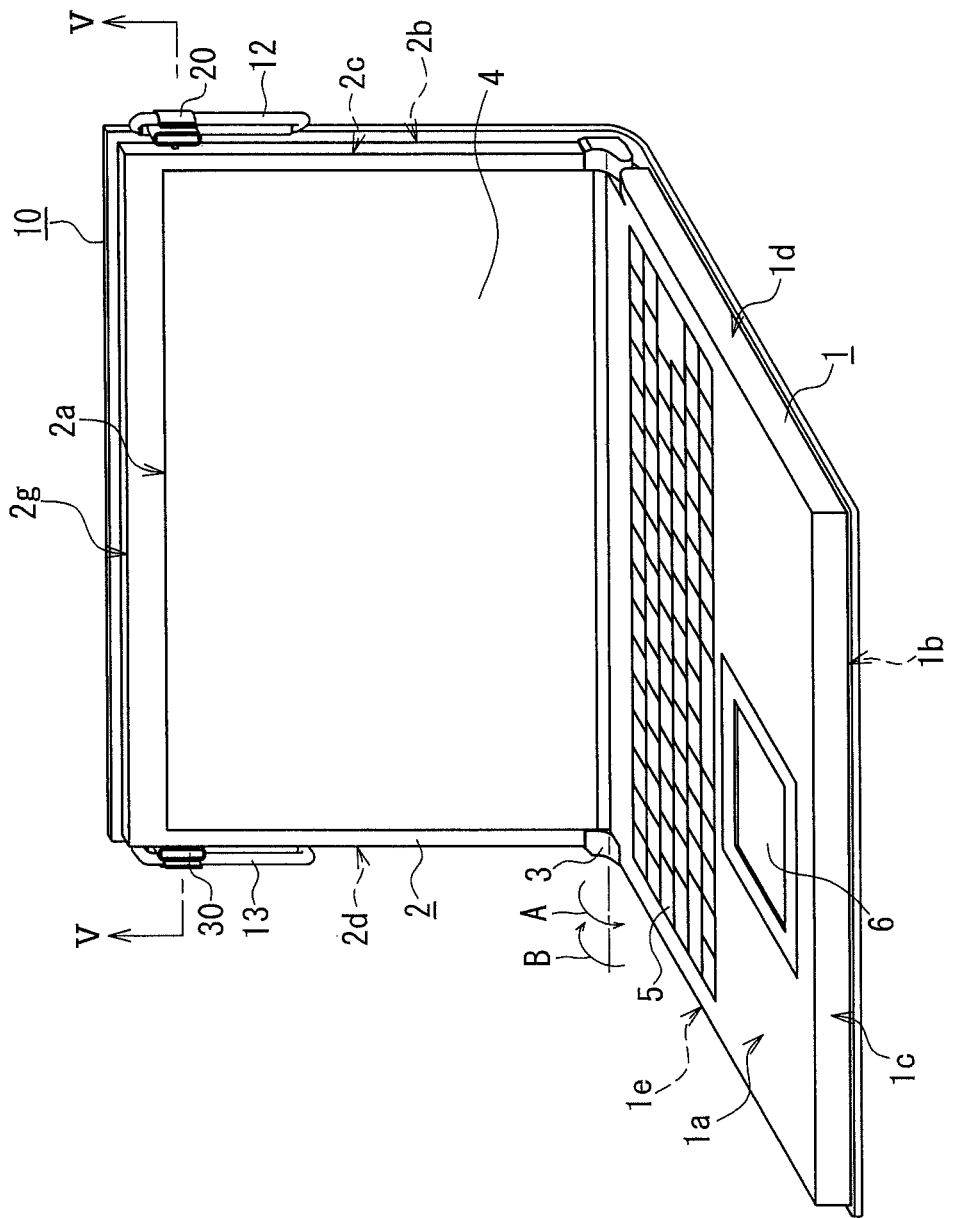
FIG. 1 is a perspective view of a notebook computer to which a protection cover according to the present embodiment is attached.
Figure 2:
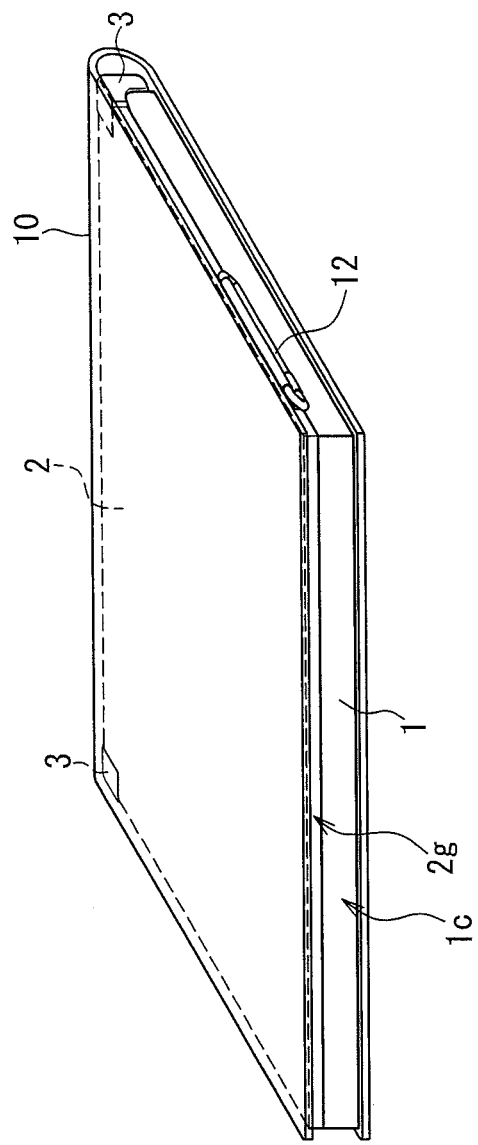
FIG. 2 is a perspective view of the notebook computer to which the protection cover according to the present embodiment is attached.

FIGS. 1 and 2 are perspective views of a notebook computer to which a protection cover according to the present embodiment is attached. FIG. 1 shows an open state of the notebook computer. FIG. 2 shows a closed state of the notebook computer.

As shown in FIG. 1, the notebook computer has a first housing 1 and a second housing 2. The first housing 1 contains a circuit board on which various electric elements are mounted, a hard disk drive, etc. The second housing 2 includes a display device 4 (e.g., liquid crystal display). The first housing 1 and the second housing 2 are supported turnably by hinge portions 3, and can be in the open and closed states as shown in FIGS. 1 and 2, respectively. Each hinge portion 3 has a rotation shaft for supporting the first housing 1 and the second housing 2 turnably in a direction indicated by an arrow A or B. A keyboard 5 and a pointing device 6 are arranged on an upper face 1a of the first housing 1.

A protection cover 10 is attachable/detachable to the notebook computer. The protection cover 10 is attachable to the notebook computer in such a manner as to mainly cover a lower face 1b of the first housing 1 and a lower face 2b of the second housing 2. The protection cover 10 includes a first support member 12 and a second support member 13. The detailed configuration of the protection cover 10 will be described later.

A first coupling member 20 is attachable/detachable to the first support member 12 and the second housing 2. The second coupling member 30 is attachable/detachable to the second support member 13 and the second housing 2. By connecting the first coupling member 20 to the first support member 12 and the second housing 2 and connecting the second coupling member 30 to the second support member 13 and the second housing 2, the second housing 2 and the protection cover 10 are connected to each other. The detailed configurations of the first coupling member 20 and the second coupling member 30 will be described later.

The first housing 1 and the protection cover 10 are connected to each other by fitting protrusion members into holes and fixing them with a screw. The connection configuration between the first housing 1 and the protection cover 10 will be described later.

[2. Configuration of the Protection Cover 10]

Figure 3:
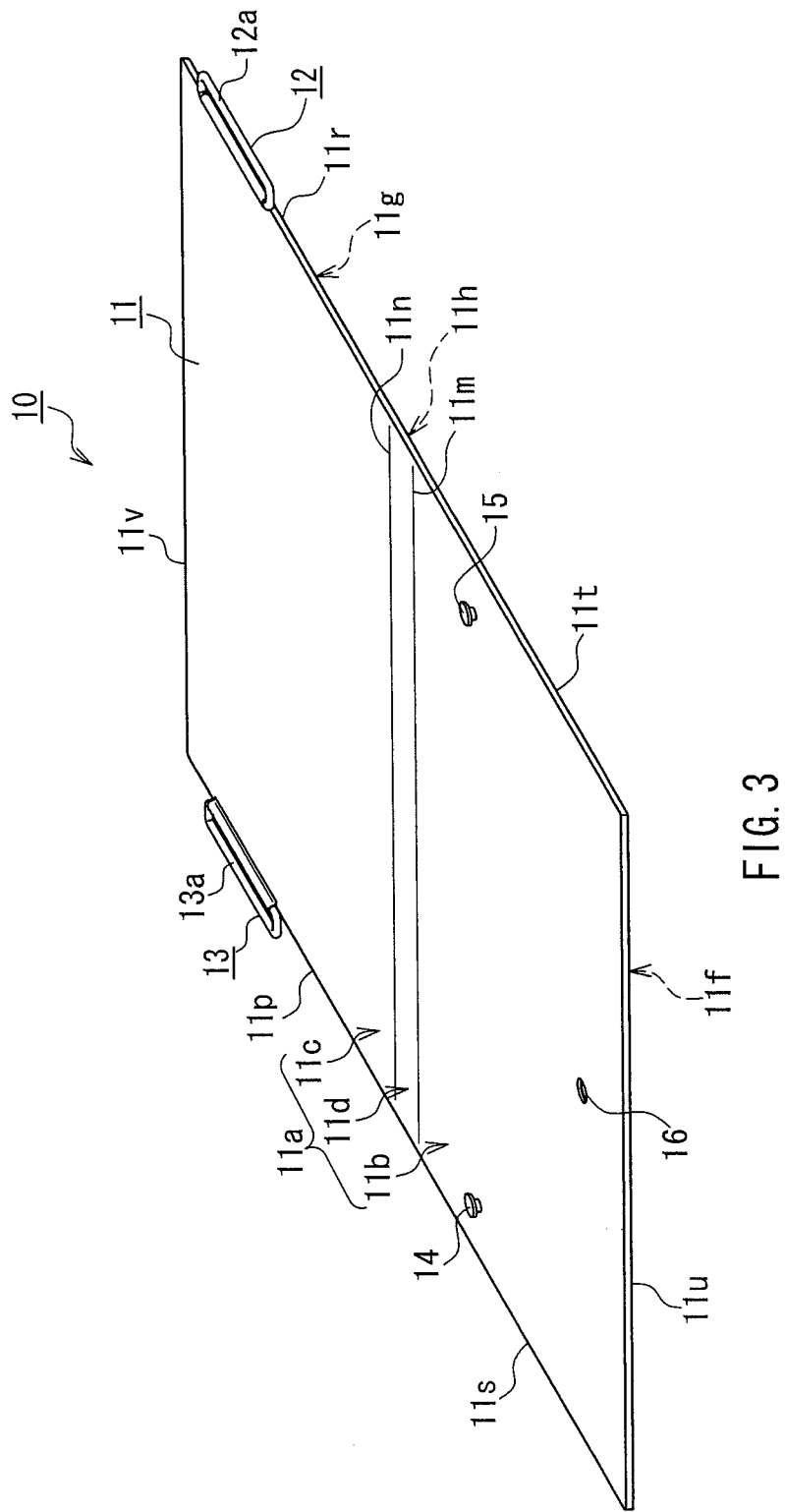
FIG. 3 is a perspective view of an inner face side of the protection cover.
Figure 4:
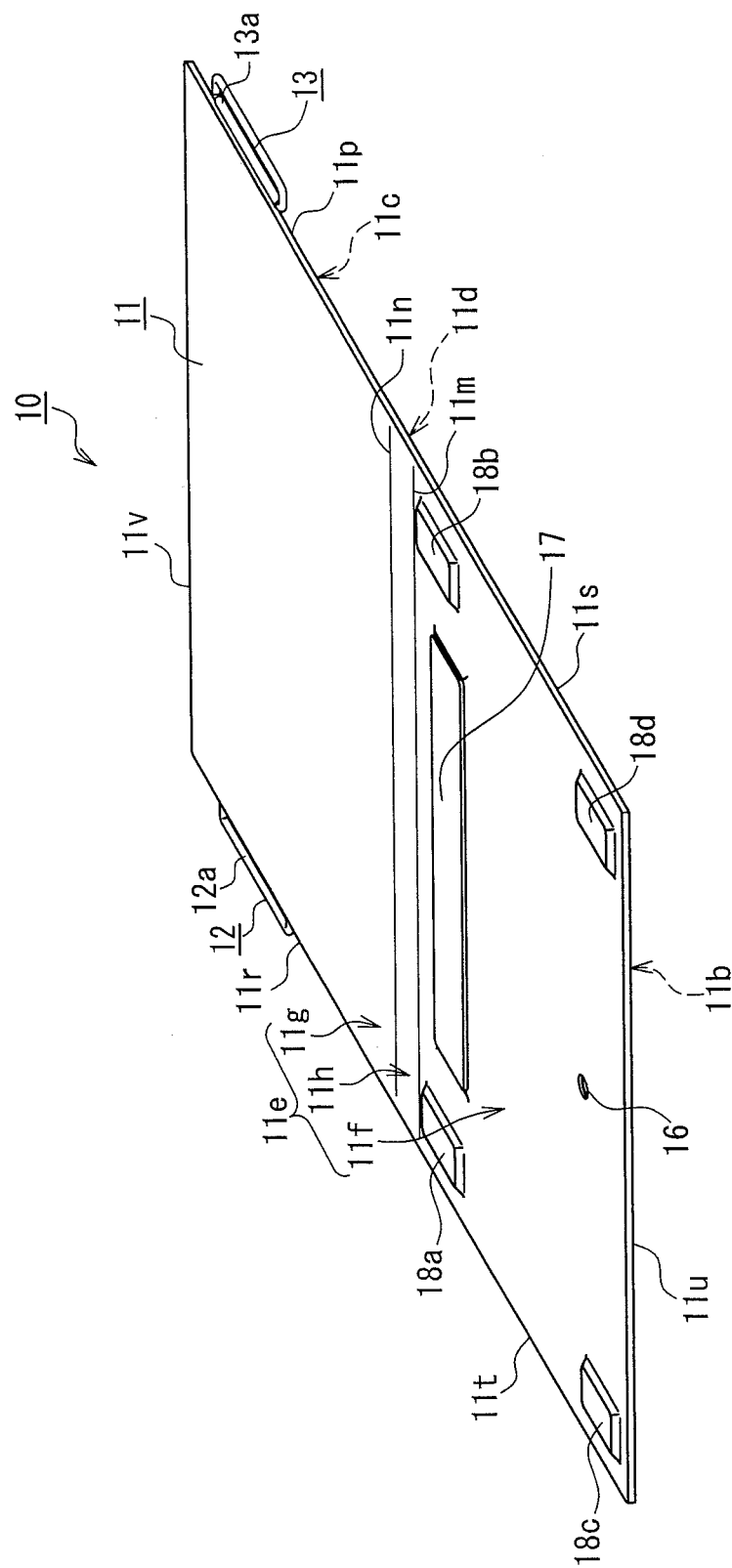
FIG. 4 is a perspective view of an outer face side of the protection cover.

FIGS. 3 and 4 are perspective views of the protection cover according to the present embodiment. FIG. 3 is a perspective view mainly showing an inner face side of the protection cover 10. FIG. 4 is a perspective view mainly showing an outer face side of the protection cover 10.

As shown in FIGS. 3 and 4, the protection cover 10 includes a main body portion 11, the first support member 12, the second support member 13, a first protrusion member 14, a second protrusion member 15, a hole 16, a grip belt 17 and raised portions 18a-18d.

The main body portion 11 is formed to have a thin rectangular plate-like shape in a plan view. By sandwiching a stiff plate-like core with a relatively flexible material (e.g., a rectangular cloth) and a relatively stiff material (e.g., a rectangular leather or synthetic leather) and seaming their outer circumferential edge portions together, the main body portion 11 is formed. The flexible material is arranged mainly on an inner face 11a side of the main body portion 11 (see FIG. 3). Since the inner face 11a of the main body portion 11 is a face contacting the notebook computer when the protection cover 10 is attached to the notebook computer, the face preferably is formed of a flexible material as in the present embodiment for preventing the first housing 1 and the second housing 2 of the notebook computer from being scratched, etc. The stiff material is arranged mainly on an outer face 11e side of the main body portion 11 (see FIG. 4). As the stiff core to be enclosed in the main body portion 11, it is possible to use plastic, for example. Since the outer face 11e of the main body portion 11 is a face being exposed to the outside when the protection cover 10 is attached to the notebook computer, forming the face with the stiff material prevents the main body portion 11 from being torn easily due to an impact, etc., applied from the outside. Note here that the shape and the materials of the main body portion 11 are examples.

As shown in FIG. 3, the inner face 11a of the main body portion 11 is composed of a first inner face portion 11b, a second inner face portion 11c and a third inner face portion 11d. The first inner face portion 11b and the third inner face portion 11d are adjacent to each other, with a first boundary portion 11m interposed therebetween in a plane direction of the inner face 11a. The second inner face portion 11c and the third inner face portion 11d are adjacent to each other, with a second boundary portion 11n interposed therebetween. The first inner face portion 11b is an area surrounded by the first boundary portion 11m and a part of the outer circumferential edge portion of the main body portion 11. The second inner face portion 11c is an area surrounded by the second boundary portion 11n and a part of the outer circumferential edge portion of the main body portion 11. The third inner face portion 11d is an area surrounded by the first boundary portion 11m, the second boundary portion 11n and a part of the outer circumferential edge portion of the main body portion 11.

As shown in FIG. 4, the outer face 11e of the main body portion 11 is composed of a first outer face portion 11f, a second outer face portion 11g and a third outer face portion 11h. The first outer face portion 11f and the third outer face portion 11h are adjacent to each other, with the first boundary portion 11m interposed therebetween. The second outer face portion 11g and the third outer face portion 11h are adjacent to each other, with the second boundary portion 11n interposed therebetween. The first outer face portion 11f is an area surrounded by the first boundary portion 11m and a part of the outer circumferential edge portion of the main body portion 11. The second outer face portion 11g is an area surrounded by the second boundary portion 11n and a part of the outer circumferential edge portion of the main body portion 11. The third outer face portion 11h is an area surrounded by the first boundary portion 11m, the second boundary portion 11n and a part of the outer circumferential edge portion of the main body portion 11. The first outer face portion 11f is arranged on the back side of the first inner face portion 11b. The second outer face portion 11g is arranged on the back side of the second inner face portion 11c. The third outer face portion 11h is arranged on the back side of the third inner face portion 11d.

The first support member 12 is fixed turnably near an edge portion 11r of the main body portion 11. The second support member 13 is fixed turnably near an edge portion 11p of the main body portion 11. Note here that the first support member 12 and the second support member 13 need not be turnable. The first support member 12 and the second support member 13 are ring-shaped members formed of resin, metal, etc. Although in the present embodiment the first support member 12 and the second support member 13 are formed so that the cross-sectional shape thereof is circular made of a metallic wire and the overall shape is a square ring, these shapes are only examples. The first support member 12 includes a straight portion 12a having a straight shape for holding the first coupling member 20 slidably. The second support member 13 includes a straight portion 13a having a straight shape for holding the second coupling member 30 slidably. The first support member 12 is fixed to the protection cover 10 such that the linear direction of the straight portion 12a is parallel to an edge portion 11r. The second support member 13 is fixed to the protection cover 10 such that the liner direction of the straight portion 13a is parallel to an edge portion 11p.

The first protrusion member 14 and the second protrusion member 15 are arranged in the first inner face portion 11b of the main body portion 11. The first protrusion member 14 is arranged near the edge portion 11s and the first boundary portion 11m in the first inner face portion 11b. The second protrusion member 15 is arranged near the edge portion 11t and the first boundary portion 11m in the first inner face portion 11b.

Although in the present embodiment the outer face 11e of the protection cover 10 shown in FIG. 4 is coated with a single color (for example, black), the color and the design of the outer face 11e are selected arbitrarily. By a manufacturer's production of the protection covers 10 using various colors and designs and user's possession of plural protection covers 10 having different colors and designs, the user can attach his/her favorable protection cover 10 to the notebook computer selectively.

Figure 5A:
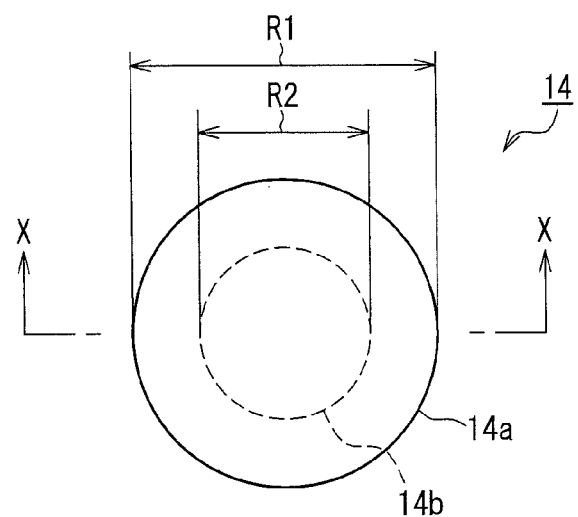
FIG. 5A is a plan view of a protrusion member.
Figure 5B:
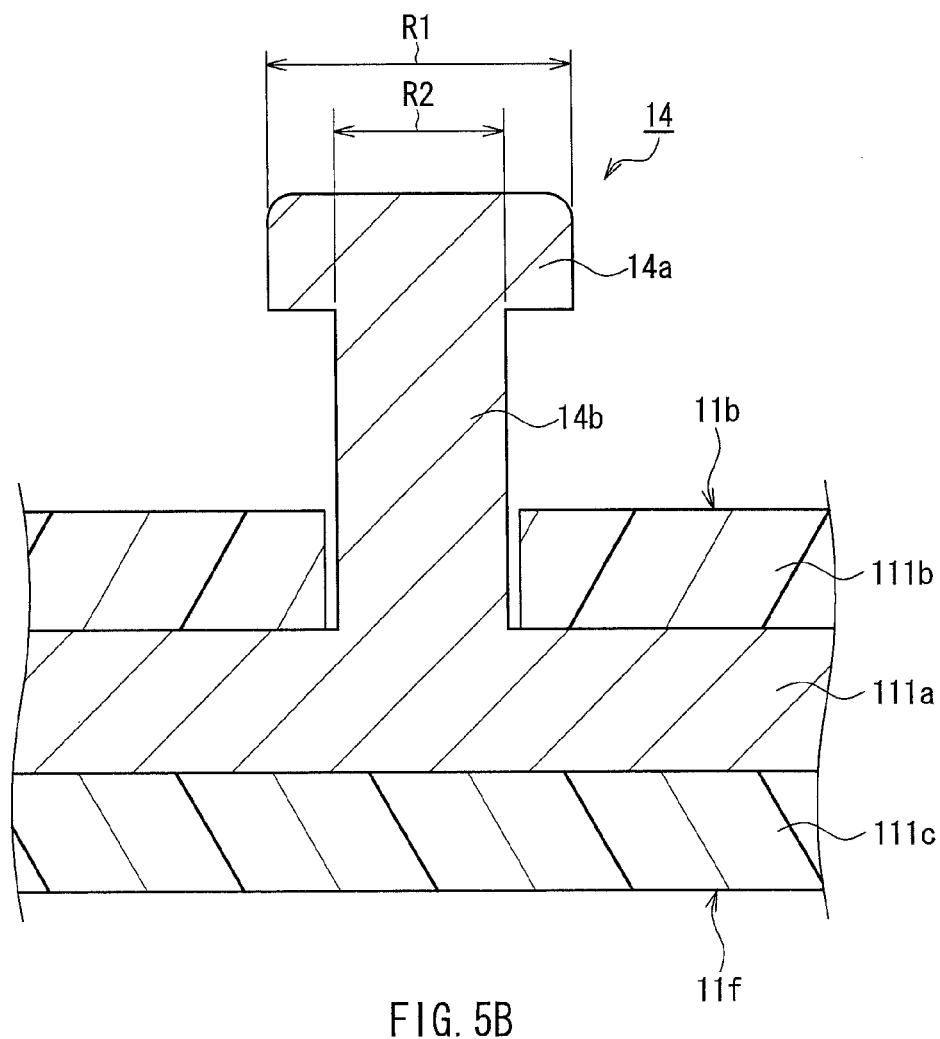
FIG. 5B is a cross-sectional view taken along a line Y-Y in FIG. 5A.

FIG. 5A is a plan view of the first protrusion member 14. FIG. 5B is a cross-sectional view showing the vicinity of the first protrusion member 14, taken along a line Y-Y in FIG. 5A. Note here that since the second protrusion member 15 has the same configuration as the first protrusion member 14, the illustration and the detailed explanation thereof will be omitted. As shown in FIGS. 5A and 5B, the first protrusion member 14 includes a tip end portion 14a having an outer diameter R1 and a shaft portion 14b having an outer diameter R2 smaller than the outer diameter R1. As shown in FIG. 5A, the tip end portion 14a is circular in a plan view. As shown in FIG. 5B, one end portion of the shaft portion 14b is connected integrally with the tip end portion 14a and the other end portion there of is connected integrally with a stiff core 111a. The stiff core 111a is sandwiched by an inner face material 111b arranged on the inner face 11a side of the protection cover 10 and an outer face material 111c arranged on the outer face 11e side of the protection cover 10.

In the main body portion 11, the hole 16 is pierced from the first inner face portion 11b to the first outer face portion 11f. The hole 16 has an inner diameter that at least allows a male screw part of a screw (described later) to be inserted therein. In the first inner face portion 11b and the first outer face portion 11f, the hole 16 is arranged near the center of an edge portion 11u in the longitudinal direction.

The grip belt 17 is arranged near the first boundary portion 11m in the first outer face portion 11f of the main body portion 11. The grip belt 17 has a gap with respect to the first outer face portion 11f of the main body portion 11 that at least allows a user's hand to be placed therein. The grip belt 17 is a plate-like member, and preferably is formed of a material having flexibility for a fit of the user's hand when the hand is placed between the first outer face portion 11f of the main body portion 11 and the belt. Further, the grip belt 17 preferably is formed of a material having elasticity for allowing hands of various sizes to be placed between the first outer face portion 11f of the main body portion 11 and the belt.

Note here that the grip belt 17 is not essential. For example, even when the notebook computer to which the protection cover 10 is attached is placed on the user's left palm and fingers, the user can operate the computer while grasping it with the left hand. Further, the position of the grip belt 17 is not limited to the first outer face portion 11f, and may be arranged near the second boundary portion 11n in the second outer face portion 11g.

The raised portions 18a-18d are formed in such a manner as to be raised from the first outer face portion 11f of the main body portion 11, and arranged near four corners in the first outer face portion 11f of the main body portion 11. The raised portions 18a-18d are provided for stabilizing the posture of the protection cover 10 when the first outer face portion 11f of the main body portion 11 is placed on a desk so as to be opposed to a desk surface. In order to bring the raised portions 18a-18d into contact with the desk surface simultaneously when the first outer face portion 11f is placed on the desk, it is preferable that, for example, all of them have the same height from the first outer face portion 11f. Further, it is preferable that the heights of the raised portions 18a and 18b from the first outer face portion 11f are at least higher than the height of the grip belt 17 from the first outer face portion 11f.

Note here that the raised portions 18a-18d are not essential. For example, when the grip belt 17 is arranged along the longitudinal direction of the first boundary portion 11m from near the edge portion 11t to near the edge portion 11s, the orientation of the notebook computer placed on the desk surface is stabilized without providing the raised portions 18a-18d. In such a case, the raised portions 18a-18d can be omitted.

[3. Configuration of the Coupling Member]

Figure 6:
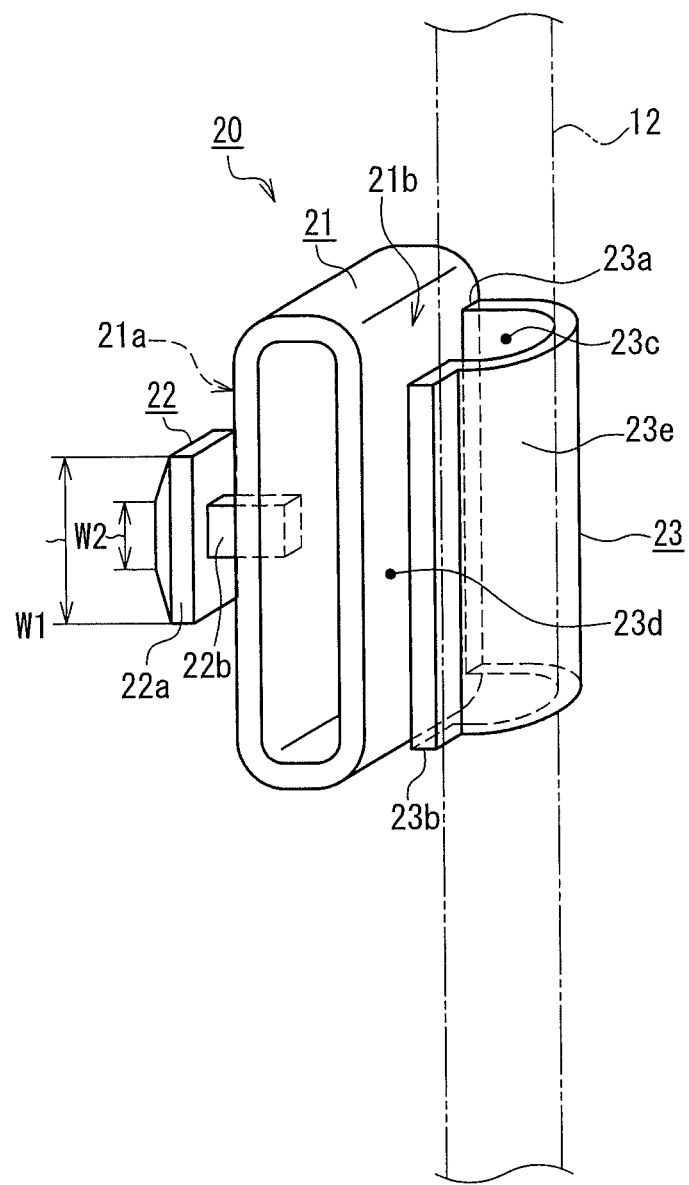
FIG. 6 is a perspective view of a coupling member.

FIG. 6 is a perspective view of the first coupling member 20. Note here that since the second coupling member 30 has the same configuration as the first coupling member 20, only the configuration of the first coupling member 20 will be described, and the explanation of the second coupling member 30 will be omitted in the present embodiment.

The first coupling member 20 mainly is composed of a base portion 21, an engagement portion 22 and a sliding portion 23, which are formed integrally of a resin, for example.

The base portion 21 includes a first side face 21a and a second side face 21b, which are in a front-back relationship. The first side face 21a is formed integrally with the engagement portion 22, and the second side face 21b is formed integrally with the sliding portion 23.

The engagement portion 22 includes a tip end portion 22a and a shaft portion 22b. The tip end portion 22a is connected integrally with an end portion of the shaft portion 22b in the axis direction. The other end portion of the shaft portion 22b is connected integrally with the first side face 21a of the base portion 21. A width dimension W1 of the tip end portion 22a is larger than a width dimension W2 of the shaft portion 22b.

The cross-section of the sliding portion 23 is formed substantially in a semicolumnar shape. An end portion 23a of the sliding portion 23 is connected integrally with the second side face 21b of the base portion 21. A gap 23d is formed between the other end portion 23b of the sliding portion 23 and the second side face 21b of the base portion 21. The sliding portion 23 includes an arc portion 23e between the end portion 23a and the other end portion 23b. A gap 23c is formed between the arc portion 23e and the second side face 21b of the base portion 21. The gap 23c has an inner radius that at least allows the first support member 12 or the second support member 13 to be placed therein.

[4. Attachement/Detachment Methods of the Protection Cover 10 to the Notebook Computer]

Hereinafter, methods of attaching/detaching the protection cover 10 shown in FIGS. 3 and 4 to the notebook computer will be described. The protection cover 10 of the present embodiment includes a member that can be fixed to the first housing 1 and a member that can be locked to the second housing 2. As the method of attaching the protection cover 10 to the notebook computer, there are a method of firstly fixing the protection cover 10 to the first housing 1 and thereafter locking the protection cover 10 to the second housing 2, and a method of firstly locking the protection cover 10 to the second housing 2 and thereafter fixing the protection cover 10 to the first housing 1. The present embodiment describes the method of firstly fixing the protection cover 10 to the first housing 1 and thereafter locking the protection cover 10 to the second housing 2.

[4-1. Method of Fixing the Protection Cover 10 to the First Housing 1]

FIG. 7A is a plan view showing the configuration of the lower face 1b of the first housing 1. As shown in FIG. 7A, the lower face 1b of the first housing 1 is formed with a first positioning hole 51, a second positioning hole 52 and a screw hole 53. The first positioning hole 51 has a combined shape of a circular hole 51a and a slot 51b. The second positioning hole 52 has a combined shape of a circular hole 52a and a slot 52b. The screw hole 53 has a female screw configuration in which a screw thread is formed on an inner surface.

Figure 7B:
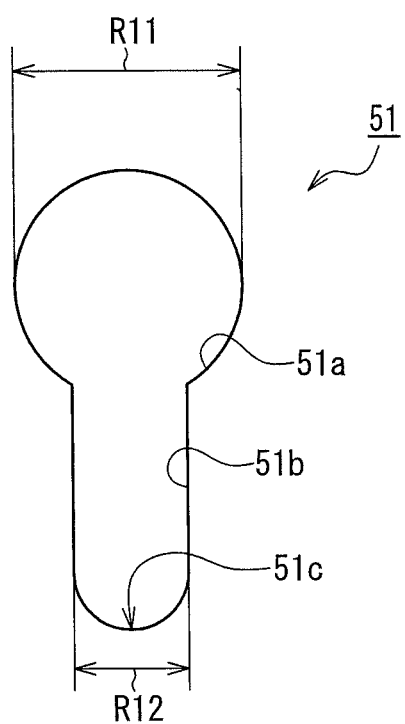
FIG. 7B is an enlarged plan view of a positioning hole.

FIG. 7B is an enlarged plan view of the first positioning hole 51. Since the second positioning hole 52 has the same configuration as the first positioning hole 51, an enlarged view thereof is omitted. As shown in FIG. 7B, the circular hole 51a has an inner diameter R11 that at least allows the tip end portion 14a of the first protrusion member 14 provided in the protection cover 10 to be inserted therein. In other words, the outer diameter R1 (see FIG. 5A) of the tip end portion 14a of the first protrusion member 14 and the inner diameter R11 of the circular hole 51a of the first positioning hole 51 have the following relationship.

$$R1 < R11$$

For positioning the circular hole 51a and the tip end portion 14a easily at the time of inserting the tip end portion 14a into the circular hole 51a, it is preferable that the inner diameter R11 of the circular hole 51a is sufficiently larger than the outer diameter R1 of the tip end portion 14a. For example, the inner diameter R11 is twice as large as the outer diameter R1.

The slot 51b has a width dimension R12 that at least allows the shaft portion 14b of the first protrusion member 14 to be inserted therein. In other words, the outer diameter R2 (see FIG. 5B) of the shaft portion 14b of the first protrusion member 14 and the width dimension R12 of the slot 51b of the first positioning hole 51 have the following relationship.

$$R2 \leq R12$$

By setting the outer diameter R2 and the width dimension R12 to have the relationship of "R2<R12", the shaft portion 14b can be slid from the circular hole 51a to the slot 51b easily at the time of sliding the first protrusion member 14 into the first positioning hole 51. Further, by setting the outer diameter R2 and the width dimension R12 to have the relationship of "R2=R12", the shaft portion 14b is fitted in the slot 51b and the mechanical looseness between the notebook computer and the protection cover 10 is less likely to occur, which is preferable.

The first positioning hole 51, the second positioning hole 52 and the screw hole 53 are formed at positions corresponding to the first protrusion member 14, the second protrusion member 15 and the hole 16 that respectively are provided in the protection cover 10. In other words, the arrangement and the space between the first positioning hole 51, the second positioning hole 52 and the screw hole 53 are equivalent to those between the first protrusion member 14, the second protrusion member 15 and the hole 16.

Hereinafter, the method of fixing the protection cover 10 to the first housing 1 will be described.

Figure 8:
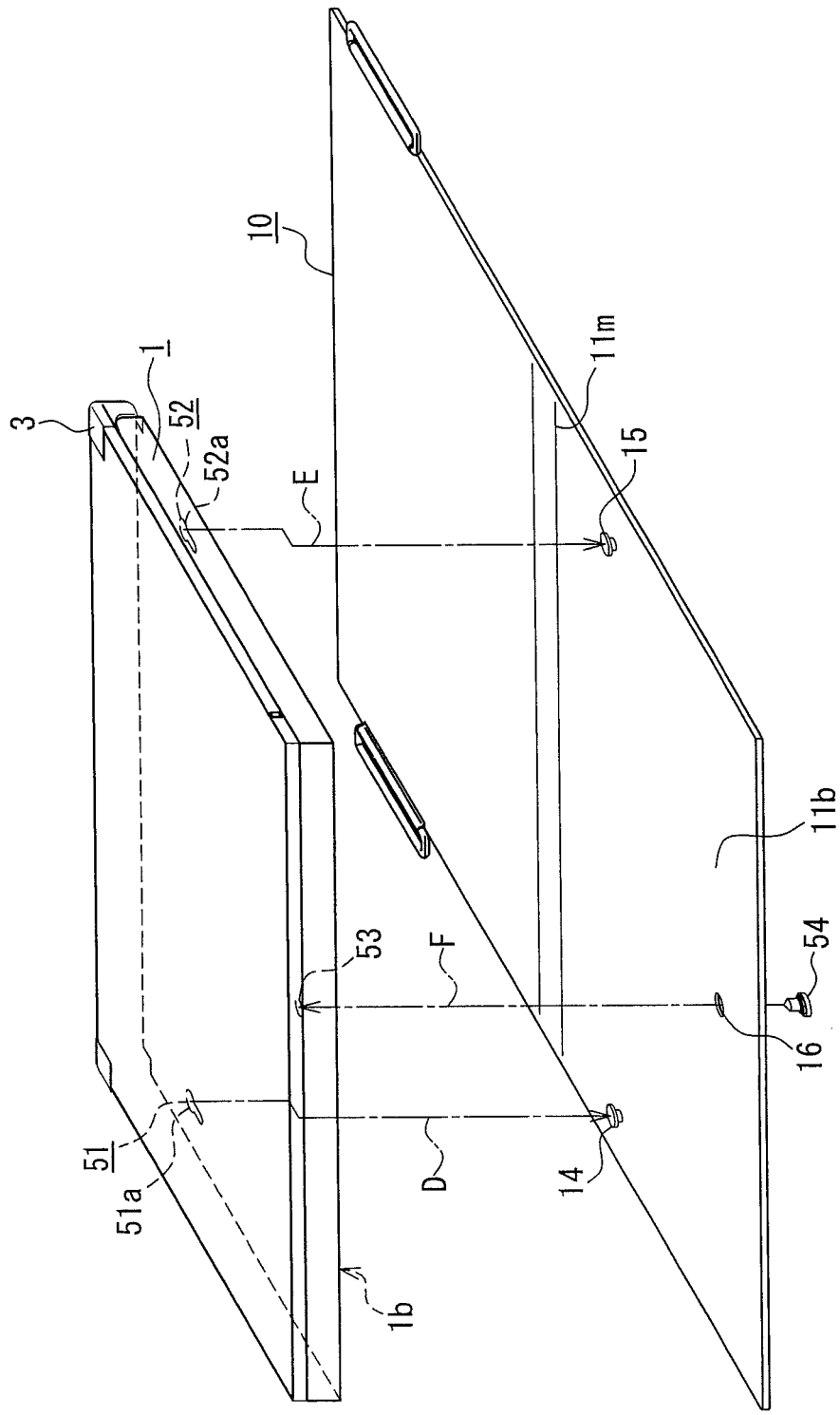
FIG. 8 is a perspective view of the notebook computer and the protection cover.
Figure 9A:
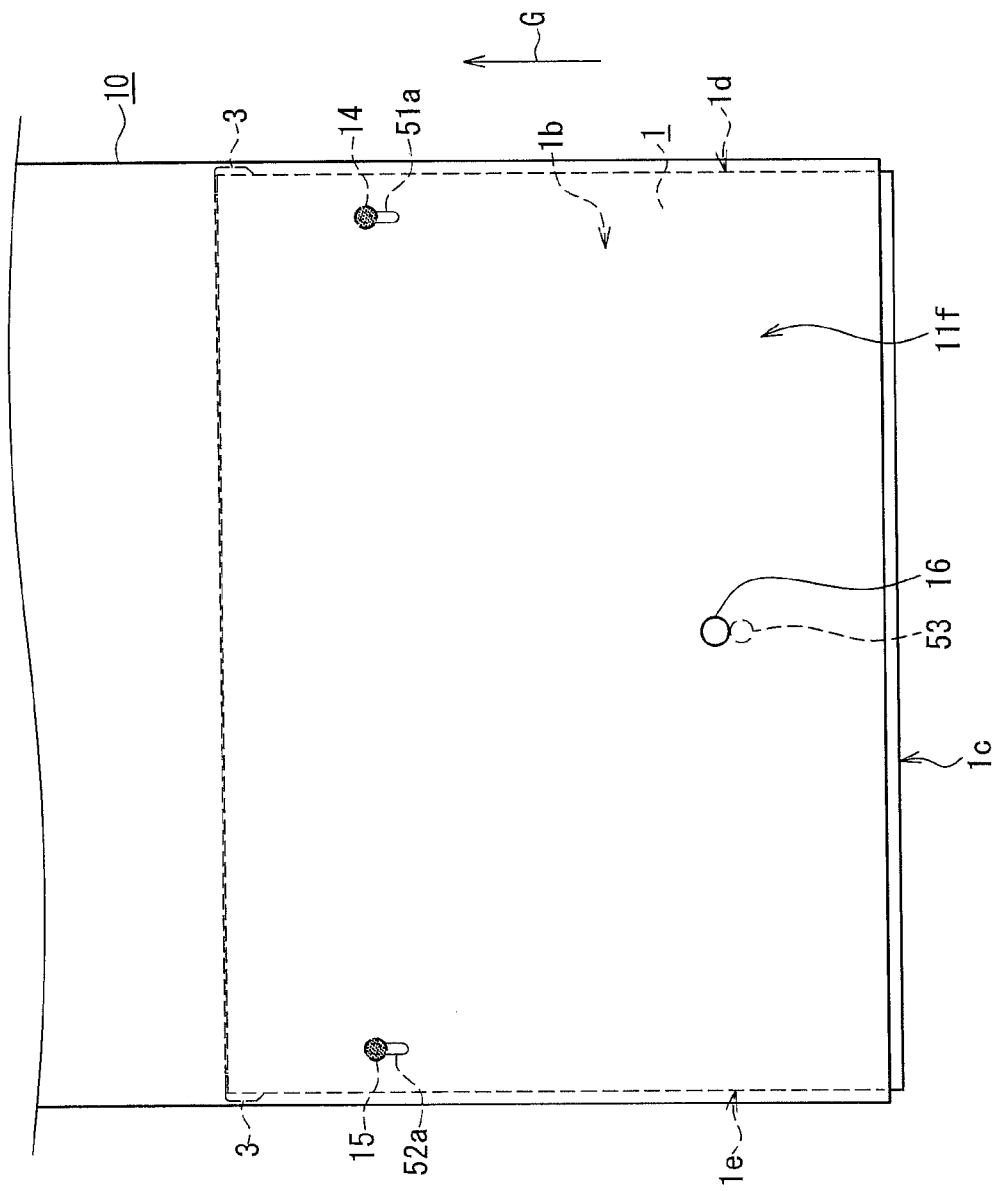
FIG. 9A is a partial plan view of the notebook computer and the protection cover.
Figure 9B:
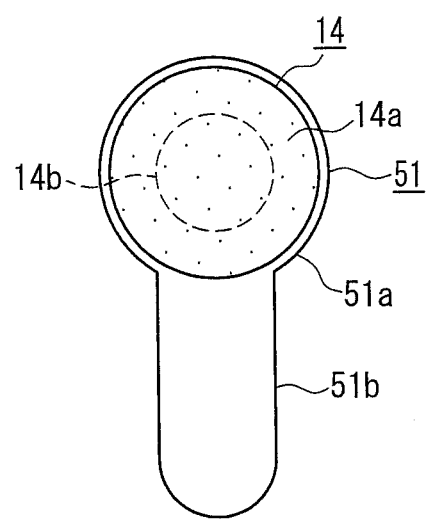
FIG. 9B is an enlarged plan view of the positioning hole and the protrusion member.
Figure 10A:
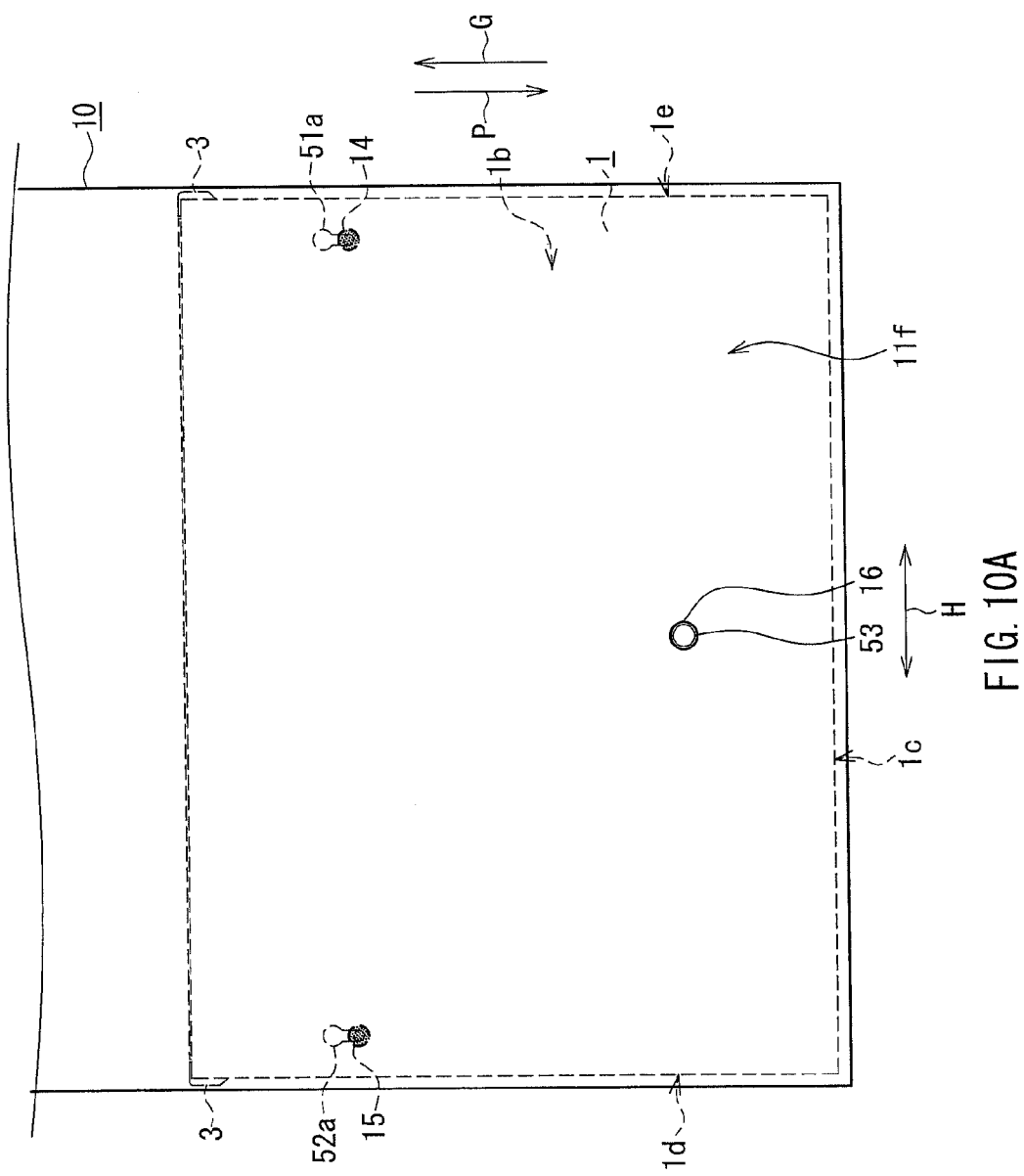
FIG. 10A is a partial plan view of the notebook computer and the protection cover.
Figure 10B:
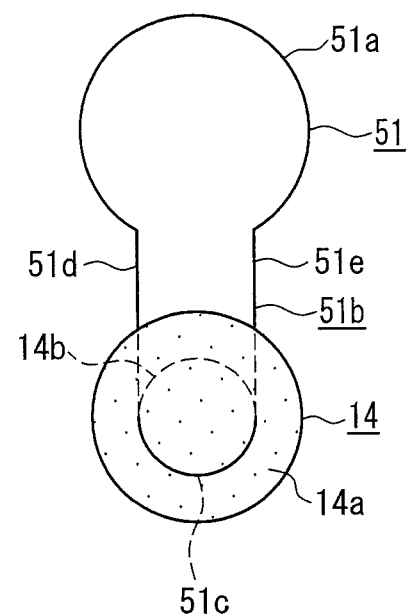
FIG. 10B is an enlarged plan view of the positioning hole and the protrusion member.
Figure 11:
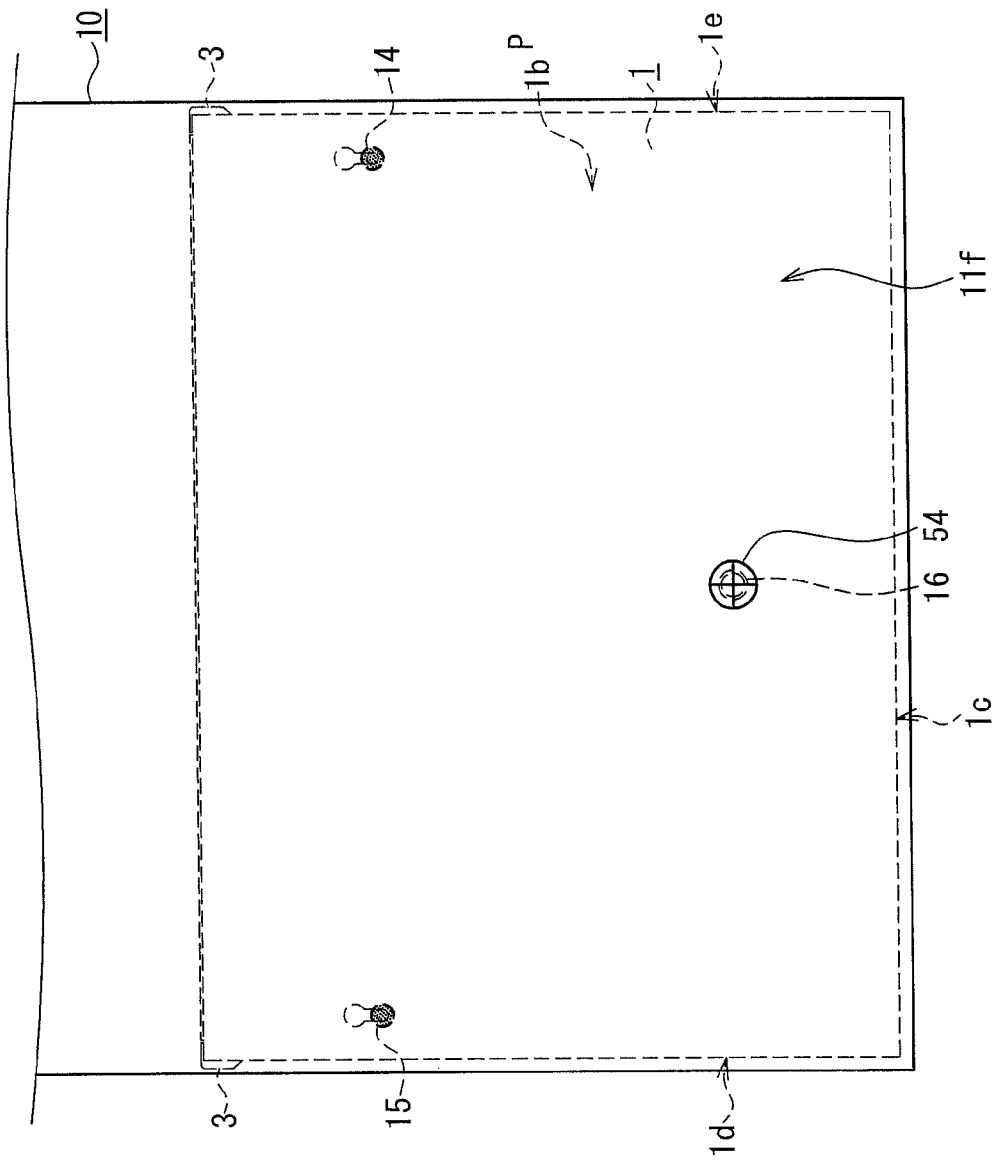
FIG. 11 is a partial plan view of the notebook computer and the protection cover.

FIG. 8 is a perspective view showing a state immediately before the protection cover 10 is fixed to the first housing 1. FIGS. 9A, 10A and 11 are plan views showing the steps by which the protection cover 10 is attached to the first housing 1. FIGS. 9B and 10B are enlarged plan views of the first protrusion member 14 and the first positioning hole 51. FIGS. 9A to 11 are plan views seen from the first outer face portion 11f side of the protection cover 10. In FIGS. 9A, 10A and 11, illustrations of the grip belt 17 and the raised portions 18a-18d are omitted for clearly showing the positional relationship between the first housing 1 and the protection cover 10. Further, the first protrusion member 14 and the second protrusion member 15 shown in FIGS. 9A, 10A and 11 are hatched with dots for clearly showing the positions.

First, as shown in FIG. 8, from the state where the protection cover 10 is separated from the notebook computer, the notebook computer is placed on the first inner face portion 11b of the protection cover 10 so that the lower face 1b of the first housing 1 is opposed to the first inner face portion 11b of the protection cover 10 and the hinge mechanisms 3 are located near the first boundary portion 11m. Although FIG. 8 shows a state where the notebook computer in the closed state is about to be placed on the first inner face portion 11b of the protection cover 10, the notebook computer in the open state as shown in FIG. 1, for example, also can be placed on the first inner face portion 11b of the protection cover 10.

At the time of placing the notebook computer on the first inner face portion 11b of the protection cover 10, the first protrusion member 14 is inserted into the circular hole 51a of the first positioning hole 51 as shown by an arrow D, and the second protrusion member 15 is inserted into the circular hole 52a of the second positioning hole 52 as shown by an arrow E. FIGS. 9A and 9B show a state where the notebook computer is placed on the first inner face portion 11b of the protection cover 10, and the first protrusion member 14 and the second protrusion member 15 are inserted into the circular hole 51a of the first positioning hole 51 and the circular hole 52a of the second positioning hole 52, respectively. Incidentally, in the state shown in FIG. 9A, the position of the hole 16 of the protection cover 10 is deviated from the position of the screw hole 53 of the first housing 1.

Next, the notebook computer is slid from the position shown in FIG. 9A in a direction indicated by an arrow G along the first inner face portion 11b of the protection cover 10. When the notebook computer is slid to the direction indicated by the arrow G, a relative positional relationship between the first positioning hole 51 and the first protrusion member 14 changes from a positional relationship shown in FIG. 9B to a positional relationship shown in FIG. 10B. In other words, the first positioning hole 51 is displaced from the state shown in FIG. 9B where the shaft portion 14b of the first protrusion member 14 is positioned in the circular hole 51a of the first positioning hole 51 to the state shown in FIG. 10B where the shaft portion 14b contacts an end portion 51c of the slot 51b. Similarly, the second positioning hole 52 is displaced from the state where a shaft portion 15b of the second protrusion member 15 is positioned in the circular hole 52a of the second positioning hole 52 to the state where the shaft portion 15b contacts an end portion of the slot 52b.

Here, the outer diameter R1 of the tip end portion 14a of the first protrusion member 14 and the width dimension R12 of the slot 51b have the following relationship.

R12<R1

Therefore, when the first protrusion member 14 and the first positioning hole 51 have the positional relationship shown in FIG. 10B, i.e., the tip end portion 14a of the first protrusion member 14 overlaps the slot 51b, and the second protrusion member 15 and the second positioning hole 52 also have a positional relationship shown in FIG. 10A, the displacement of the first housing 1 is regulated in the axis direction of the shaft portion 14b of the first protrusion member 14.

When the notebook computer is slid to the position shown in FIG. 10A in the first inner face portion 11b of the protection cover 10, the first protrusion member 14 contacts the end portion 51c of the slot 51b (farthest end portion from the circular hole 51a) and the second protrusion member 15 contacts the end portion of the slot 52b (farthest end portion from the circular hole 52a). Thus, the sliding of the notebook computer to the direction indicated by the arrow G is regulated.

Further, since side portions 51d and 51e, which are parallel and opposed to each other in the slot 51b, contact the shaft portion 14b or are adjacent to the shaft portion 14b with a little space interposed therebetween, the position of the shaft portion 14b is regulated in a direction of an arrow H shown in FIG. 10A. Thus, the position of the notebook computer with respect to the protection cover 10 is regulated in the direction of the arrow H, whereby the notebook computer can be fixed to the protection cover 10 while the mechanical looseness with respect to the protection cover 10 is minimized.

Further, in the state shown in FIG. 10A, the hole 16 overlaps the screw hole 53 so that the centers thereof coincide with each other.

Next, as shown in FIG. 11, a screw 54 is inserted in the hole 16 from the first outer face portion 11f side of the protection cover 10 and screwed into the screw hole 53. Since an outer diameter of a tip end portion of the screw 54 is larger than the inner diameter of the hole 16 formed in the protection cover 10, the protection cover 10 can be sandwiched by the tip end portion of the screw 54 and the first housing 1, by screwing the screw 54 into the screw hole 53. Therefore, the protection cover 10 can be fixed to the first housing 1.

Thus, it is possible to fix the notebook computer to the first inner face portion 11b of the protection cover 10.

In the case of detaching the protection cover 10 from the notebook computer, in FIG. 11, firstly the screw 54 is detached from the screw hole 53 (see FIG. 10A) and the hole 16. Thus, the notebook computer and the protection cover 10 are shifted to the state shown in FIG. 10A. In the state shown in FIG. 10A, the first protrusion member 14 is engaged with the first positioning hole 51, and the second protrusion member 15 is engaged with the second positioning hole 52.

Next, the notebook computer is slid from the position shown in FIG. 10A to the direction indicated by the arrow G, thereby being displaced to the position shown in FIG. 9A. Specifically, as shown in FIG. 9B, the notebook computer is slid to the position where the tip end portion 14a of the first protrusion member 14 overlaps with the circular hole 51a of the first positioning hole 51 (although the illustration is omitted, the same can be said about the second protrusion member 15 and the second positioning hole 52).

Then, by removing the first protrusion member 14 and the second protrusion member 15 from the first positioning hole 51 and the second positioning hole 52, respectively, it is possible to detach the notebook computer from the protection cover 10.

[4-2. Method of Locking the Protection Cover 10 to the Second Housing 2]

Figure 12A:
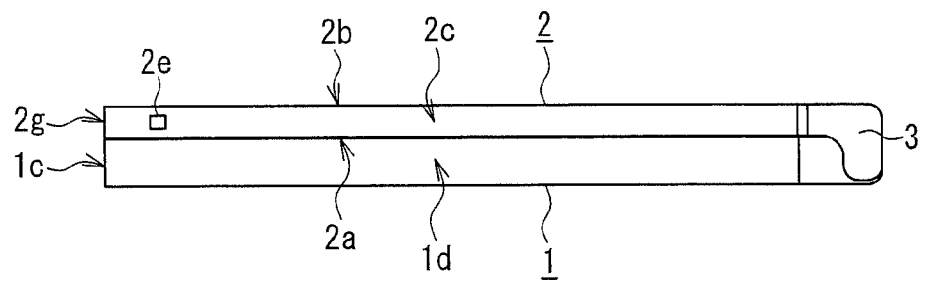
FIG. 12A is a side view showing a configuration of a right side face of the notebook computer.
Figure 12B:
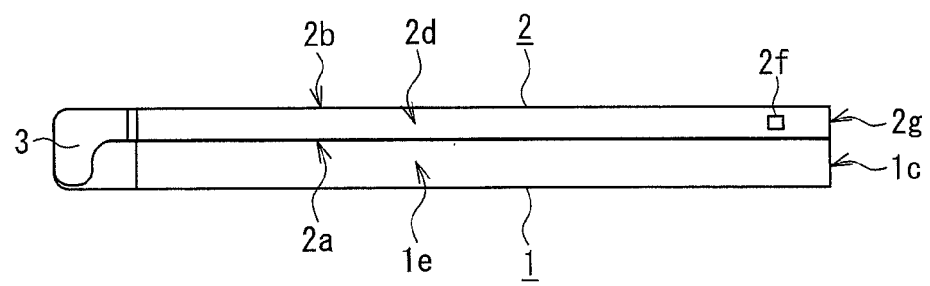
FIG. 12B is a side view showing a configuration of a left side face of the notebook computer.

FIG. 12a is view showing a right side face of the notebook computer. FIG. 12B is a view showing a left side face of the notebook computer. As shown in FIG. 12A, a right side face 2c of the second housing 2 is provided with a first engagement hole 2e, which preferably is positioned near a front face 2g side in the right side face 2c. As shown in FIG. 12B, a left side face 2d of the second housing 2 is provided with a second engagement hole 2f, which preferably is positioned near the front face 2g side in the left side face 2d. The first engagement hole 2e and the second engagement hole 2f have opening areas that at least allow the engagement portion 22 of the first coupling member 20 (the second coupling member 30 has the same configuration) to be inserted therein. Although in the present embodiment the first engagement hole 2e and the second engagement hole 2f are squares, the holes may have any shape as long as at least the engagement portion 22 of the first coupling member 20 can be inserted therein and the tip end portion 22a can be engaged therewith.

Incidentally, in the second housing 2, an upper face 2a is a face closely opposed to the upper face 1a of the first housing 1 when the notebook computer is closed as shown in FIG. 2. The lower face 2b is a back face of the upper face 2a. The right side face 2c is a side face on the right side as viewed from the user's position when the user faces the display device 4 of the notebook computer in the open state as shown in FIG. 1. The left side face 2d is an opposite face of the right side face 2c. The front face 2g is a face adjacent to the upper face 2a, the right side face 2c and the left side face 2d.

Hereinafter, the method of locking the protection cover 10 to the second housing 2 will be described.

Figure 13A:
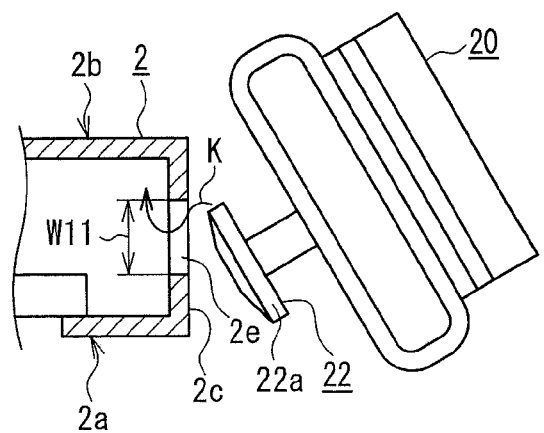
FIG. 13A is a schematic view showing a state before the coupling member is attached to a second housing.
Figure 13B:
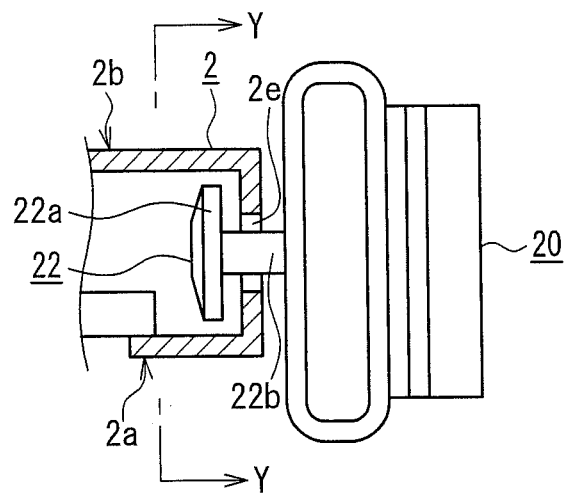
FIG. 13B is a schematic view showing a state after the coupling member is attached to the second housing.
Figure 14A:
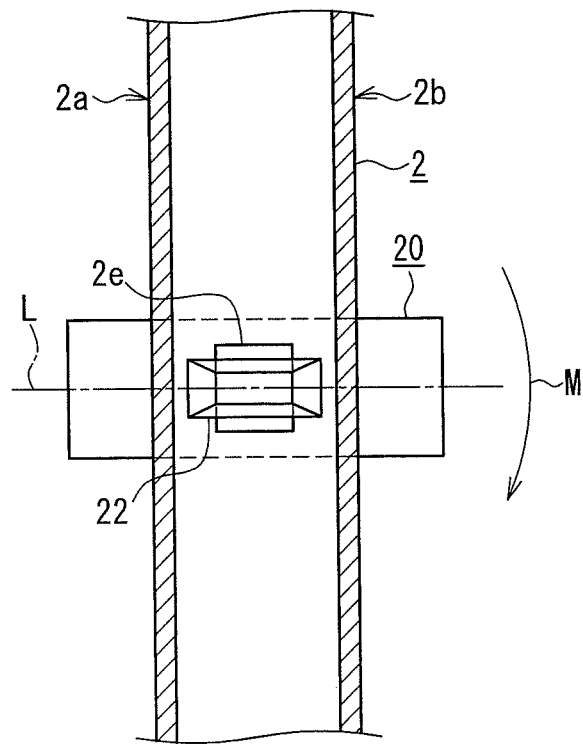
FIG. 14A is a cross-sectional view taken along a line Z-Z in FIG. 13B.
Figure 14B:
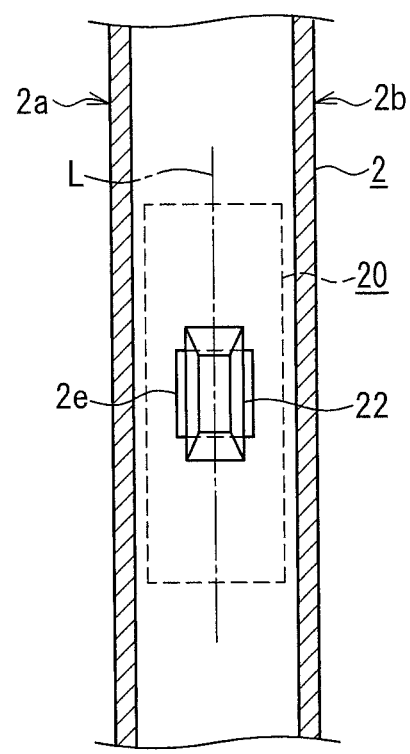
FIG. 14B is a cross-sectional view showing a state where the coupling member is locked to the second housing.
Figure 15:
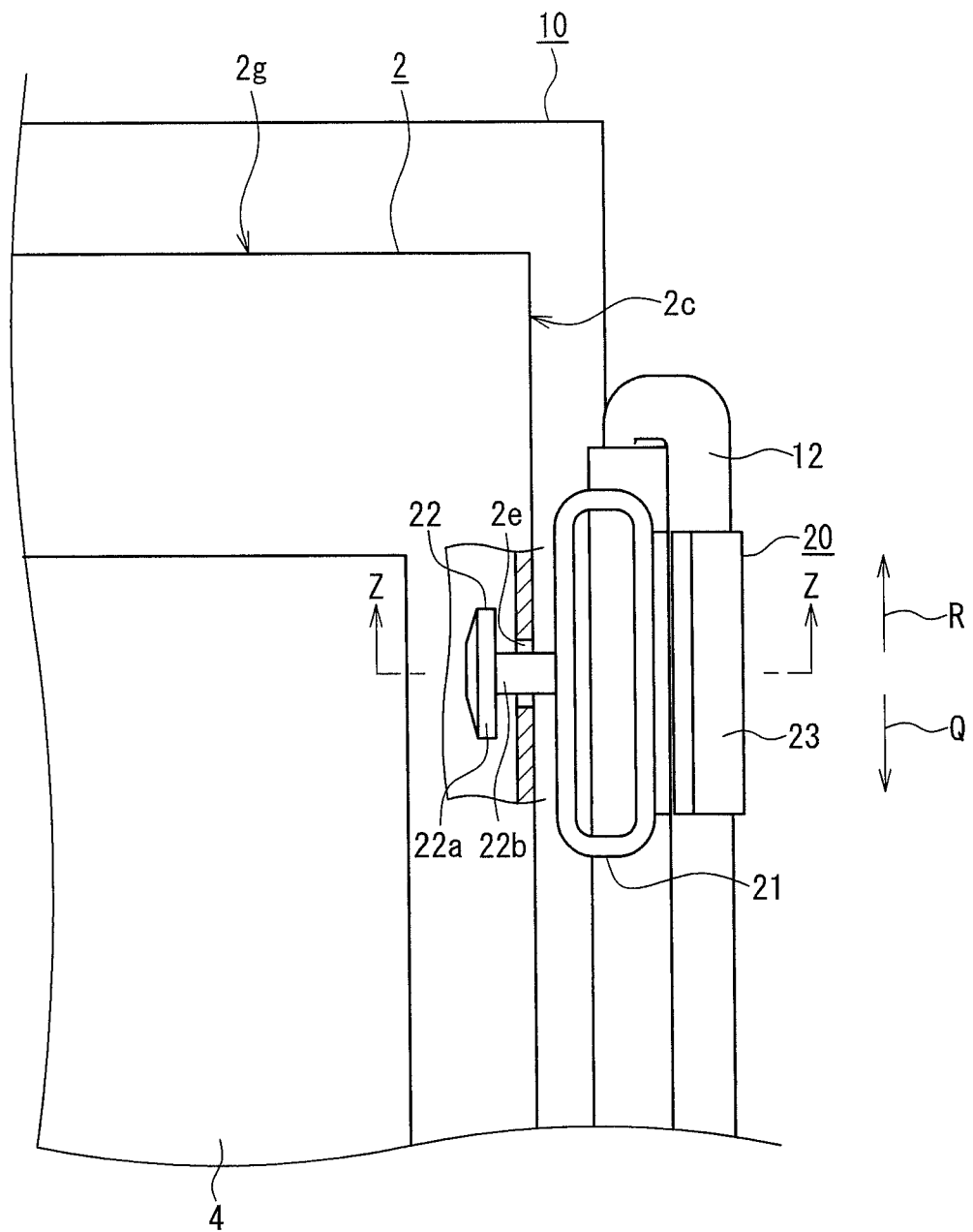
FIG. 15 is a partial plan view showing the vicinity of a support member of the protection cover.
Figure 16:
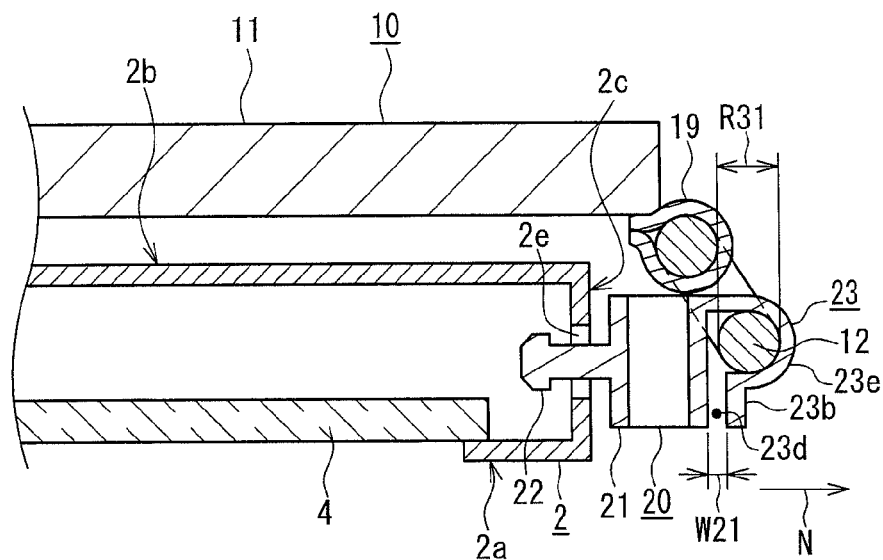
FIG. 16 is a cross-sectional view taken along a line Z-Z in FIG. 15.

FIG. 13A is a cross-sectional view showing a state before the first coupling member 20 is attached to the second housing 2. FIG. 13B is a cross-sectional view showing a state after the first coupling member 20 is attached to the second housing 2. FIGS. 13A and 13B show cross sections of the vicinity of the right side face 2c taken along a line V-V in FIG. 1. FIGS. 14A and 14B are cross-sectional views taken along a line Y-Y in FIG. 13B. FIG. 14A is a view of the first coupling member 20 in the state shown in FIG. 13B. FIG. 15 is a partial plan view showing a state where the first coupling member 20 is attached to the second housing 2 and the first support member 12. A part of FIG. 15 is illustrated cross-sectionally for clearly showing the connection part of the second housing 2 and the first coupling member 20. FIG. 16 is a cross-sectional view taken along a line Z-Z in FIG. 15.

In the case of locking the protection cover 10 to the second housing 2, firstly the first coupling member 20 and the second coupling member 30 are engaged with the first engagement hole 2e and the second engagement hole 2f, respectively. Specifically, the engagement portion 22 of the first coupling member 20 is inserted into the first engagement hole 2e as shown in FIG. 13A. At this time, since an opening width W11 of the first engagement hole 2e and the width dimension W1

(see FIG. 6) of the tip end portion 22a of the engagement portion 22 have a relationship of W11<W1, the first coupling member 20 is inserted into the first engagement hole 2e from an end portion of the tip end portion 22a while being inclined with respect to the right side face 2c (see an arrow K).

As shown in FIG. 13B, when the engagement portion 22 is inserted into the first engagement hole 2e until the tip end portion 22a is housed in the second housing 2, the shaft portion 22b is passed through the first engagement hole 2e. At this time, since the width dimension W2 (see FIG. 6) of the shaft portion 22b and the opening width W11 of the first engagement hole have a relationship of W2<W11, a little space is formed between the shaft portion 22b and the first engagement hole 2e. Further, since the opening width W11 of the first engagement hole 2e and the width dimension W1 (see FIG. 6) of the tip end portion 22a of the engagement portion 22 have a relationship expressed by the above-described relational formula, the tip end portion 22a is not detached from the first engagement hole 2e easily.

Next, the first coupling member 20 is rotated. As shown in FIGS. 13B and 14A, after the first coupling member 20 is engaged with the first engagement hole 2e, a cylindrical axis L of the sliding portion 23 intersects with the upper face 2a of the second housing 2. From this state, the first coupling member 20 is rotated by about 90 degrees about the shaft portion 22b in the direction indicated by an arrow M (see FIG. 14A), whereby the cylindrical axis L of the sliding portion 23 is substantially parallel to the upper face 2a of the second housing 2 as shown in FIG. 14B.

Next, the first support member 12 is fitted in the sliding portion 23 of the first coupling member 20. Specifically, in FIG. 16, by grasping the other end portion 23b of the sliding portion 23 and displacing it in the direction indicated by an arrow N, the arc portion 23e is deformed elastically. Thus, by displacing the other end portion 23b in the direction indicated by the arrow N, a width dimension W21 of the gap 23d is enlarged. The sliding portion 23 is deformed elastically until the width dimension W21 of the gap 23d becomes larger than an outer diameter R31 of the first support member 12. Then, the first support member 12 is moved into the gap 23c via the gap 23d. By releasing the other end portion 23b after the first support member 12 is moved into the gap 23c, the sliding portion 23 is returned to the shape before the deformation by the elastic returning force. Thus, as shown in FIG. 16, the first support member 12 is fitted in the sliding portion 23.

As shown in FIGS. 15 and 16, when the first support member 12 is fitted in the first coupling member 20, it is possible to slide the first coupling member 20 along the first support member 12 in the direction indicated by the arrow R or Q.

Incidentally, as shown in FIG. 16, the first support member 12 is wrapped partially with a cloth material 19 and the cloth material 19 is sewn to the main body portion 11 of the protection cover 10, thereby being fixed to the main body portion 11.

Similarly to the manner described above, the second coupling member 30 is engaged with the second engagement hole and the second support member 13 is fitted in the second coupling member 30. Thus, the locking of the protection cover 10 to the second housing 2 is completed.

[5. Opening/Closing Motions of the Notebook Computer and the Protection Cover 10]

Figure 17A:
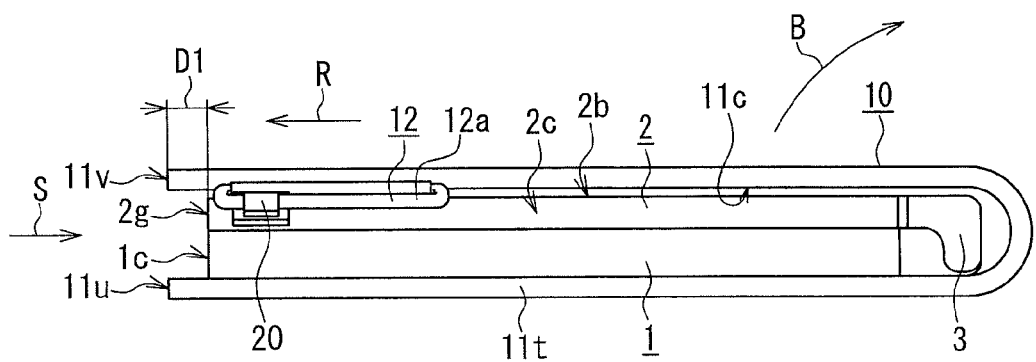
FIG. 17A is a side view of the notebook computer in a closed state.
Figure 17B:
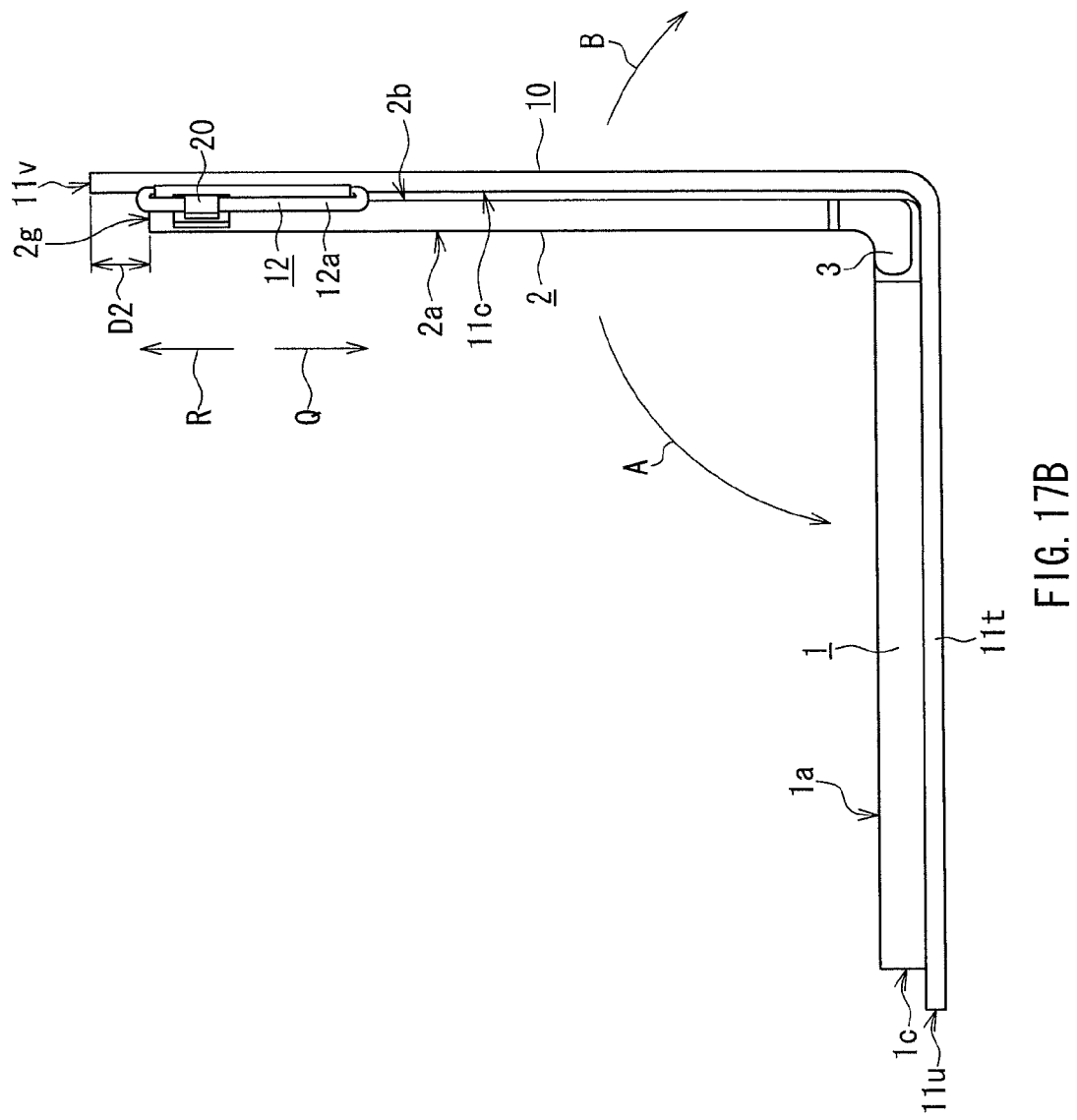
FIG. 17B is a side view of the notebook computer in about a 90-degree open state.
Figure 17C:
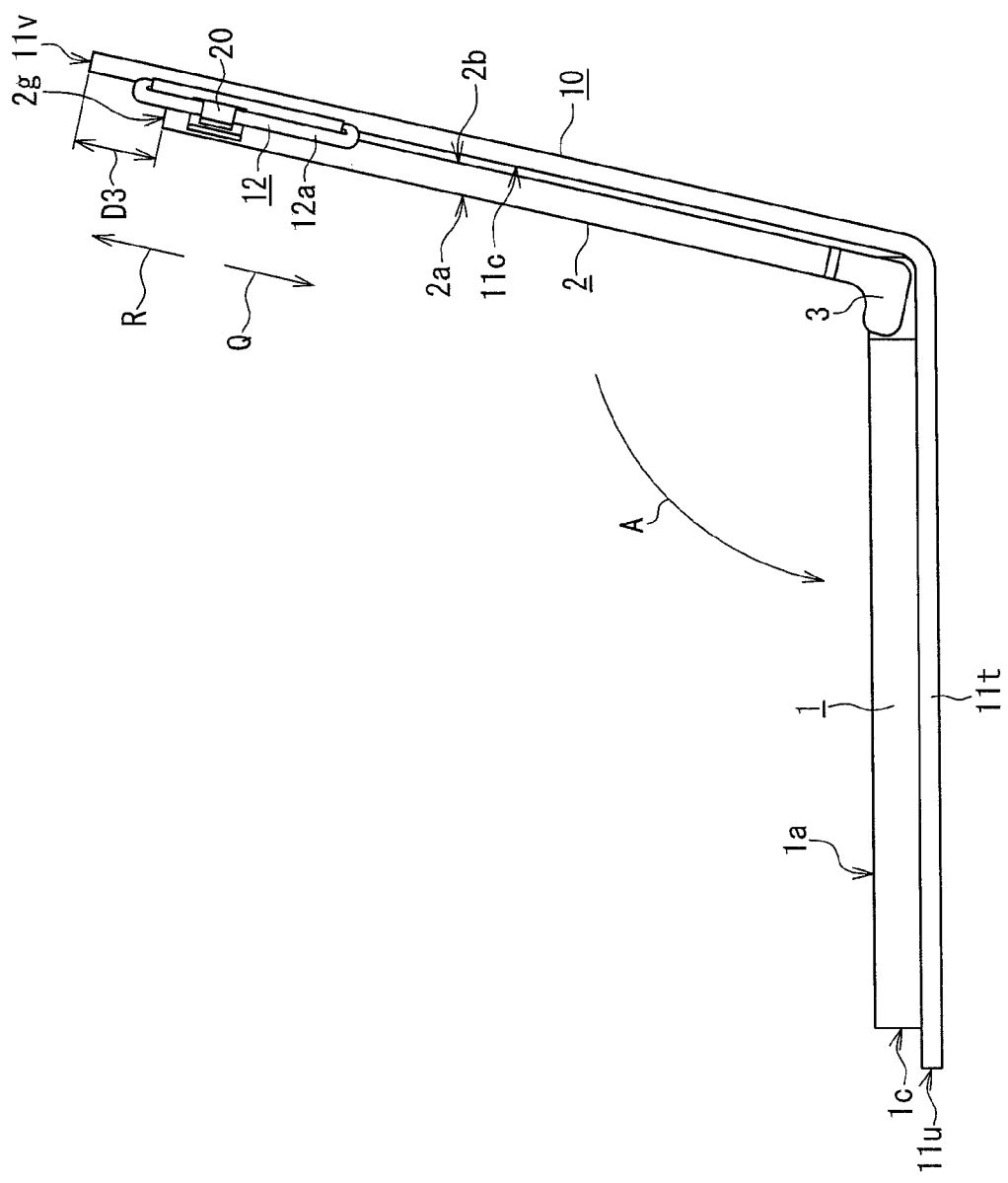
FIG. 17C is a side view of the notebook computer in about a 110-degree open state.

Hereinafter, motions at the time of opening/closing the notebook computer with the protection cover 10 will be described. FIG. 17A is a side view showing a state where the notebook computer is closed, and is a side view of the notebook computer in the state shown in FIG. 2. FIG. 17B is a side view showing a state where the notebook computer is opened about 90 degrees from the state shown in FIG. 17A, and is a side view of the notebook computer in the state shown in FIG. 1. FIG. 17C is a side view showing a state where the notebook computer is opened about 110 degrees from the state shown in FIG. 17A. Incidentally, although the motions of the first coupling member 20 at the time of opening/closing the notebook computer are illustrated in FIGS. 17A to 17C, the second coupling member 30 moves similarly to the first coupling member 20.

First, in the state shown in FIG. 17A, the first coupling member 20 is positioned near one end portion of the straight portion 12a of the first support member 12. Further, although the illustration is omitted, the second coupling member 30 is positioned near one end portion of the straight portion 13a of the second support member 13 (see FIG. 4). The "one end portion of the straight portion" refers to an end portion in each of the straight portions 12a and 13a on a side close to an edge portion 11v in the linear direction. Further, "the other end portion of the straight portion" refers to an end portion in each of the straight portions 12a and 13a on a side close to the edge portion 11v of the protection cover 10 in the linear direction.

Further, in the state shown in FIG. 17A, a front face 1c of the first housing 1 is substantially flush with the front face 2g of the second housing 2. Further, the edge portion 11u of the protection cover 10 is substantially flush with the edge portion 11v. The edge portions 11u and 11v of the protection cover 10 protrude from the front face 1c of the first housing 1 and the front face 2g of the second housing 2 by a dimension D1.

Next, the second housing 2 is turned from the state shown in FIG. 17A in a direction indicated by an arrow B. When the second housing 2 is turned, a relative position between the second housing 2 and the protection cover 10 changes, but a relative position between the first housing 1 and the protection cover 10 does not change because they are fixed by the screw 54.

The second housing 2 and the protection cover 10 are coupled by the first coupling member 20 and the second coupling member 30, and the first coupling member 20 and the second coupling member 30 are engaged slidably with the first support member 12 and the second support member 13, respectively. Therefore, when the second housing 2 is turned from the state shown in FIG. 17A to the direction indicated by the arrow B, a relative position of the first support member 12 with respect to the first coupling member 20 changes in the direction indicated by the arrow R. Although the illustration is omitted, a relative position of the second support member 13 with respect to the second coupling member 30 also changes in the direction indicated by the arrow R. Consequently, as shown in FIG. 17B, the position of the first coupling member 20 in the straight portion 12a of the first support member 12 is displaced to the other end portion side as compared with the position shown in FIG. 17A.

Note here that a protrusion amount D2 of the edge portion 11v of the protection cover 10 with respect to the front face 2g of the second housing 2 in the state shown in FIG. 17B is larger than the protrusion amount D1 shown in FIG. 17A.

Further, a space formed between the lower face 2b of the second housing 2 and the second inner face portion 11c of the protection cover 10 in the state shown in FIG. 17B is substantially equivalent to a space formed therebetween in the state shown in FIG. 17A. This is because the protection cover 10 is slidable with respect to the second housing 2.

Next, when the second housing 2 is turned further from the state shown in FIG. 17B in the direction indicated by the arrow B, the relative position of the first coupling member 20 with respect to the first support member 12 changes further in the direction indicated by the arrow R. Although the illustration is omitted, the relative position of the second coupling member 30 with respect to the second support member 13 also changes in the direction indicated by the arrow R. For example, when the second housing 2 is turned to the position at which the turning angle becomes about 110 degrees with respect to the first housing 1 as shown in FIG. 17C, the position of the first coupling member 20 in the straight portion 12a of the first support member 12 is displaced further to the other end portion side as compared with the position shown in FIG. 17B.

Note here that a protrusion amount D3 of the edge portion 11v of the protection cover 10 with respect to the front face 2g of the second housing 2 in the state shown in FIG. 17C is larger than the protrusion amount D2 shown in FIG. 17B.

Further, a space formed between the lower face 2b of the second housing 2 and the second inner face portion 11c of the protection cover 10 in the state shown in FIG. 17C is substantially equivalent to the spaces formed therebetween in the states shown in FIGS. 17A and 17B. This is because the protection cover 10 is slidable with respect to the second housing 2.

By turning the second housing 2 from the state shown in FIG. 17C to the direction indicated by the arrow A, the notebook computer can be shifted to the state shown in FIG. 17A via the state shown in FIG. 17B. When the second housing 2 is turned in the direction indicated by the arrow A, the relative position between the second housing 2 and the protection cover 10 (the position of the second inner face portion 11c in the plane direction) changes. However, since the first coupling member 20 is supported slidably with respect to the first support member 12, the space between the second housing 2 and the second inner face portion 11c of the protection cover 10 does not change significantly.

[6. Effects of Embodiment, Etc.]

According to the present embodiment, since the protection cover 10 is attachable to an outer frame of a notebook computer, it is possible to prevent the computer from being scratched or the like even when disturbances, such as an impact or contact, are applied to the first housing 1 and the second housing 2. Further, even when the notebook computer is dropped mistakenly on the floor or the like, the protection cover 10 absorbs impact energy from the dropping, thereby reducing the chance of the first housing 1, the second housing 2 and components housed therein being damaged.

The first housing 1 of the present embodiment includes the first positioning hole 51 and the second positioning hole 52. Further, the protection cover 10 of the present embodiment includes the first protrusion member 14 and the second protrusion member 15. Furthermore, the first positioning hole 51 and the second positioning hole 52 include the circular hole 51a, the slot 51b and the circular hole 52a, the slot 52b, respectively. In such a configuration, by inserting the first protrusion member 14 and the second protrusion member 15 into the circular holes 51a and 52a, respectively, and sliding the first housing 1 (notebook computer) such that the shaft portion 14b of the first protrusion member 14 and the shaft portion 15b of the second protrusion member 15 are moved into the slots 51b and 52b, respectively, the protection cover 10 can be locked to the first housing 1. In other words, by simply sliding the first housing 1, it is possible to lock the protection cover 10 to the first housing 1.

According to the present embodiment, since the first housing 1 and the protection cover 10 are fixed by the screw 54, the first housing 1 can be fixed to the protection cover 10 reliably. Therefore, even if disturbances, such as an impact, are applied to the notebook computer to which the protection cover 10 is attached, the position of the protection cover 10 is not displaced with respect to the first housing 1, whereby the notebook computer can be protected more reliably. Further, by fixing the first housing 1 and the protection cover 10 using the screw 54 and providing the protection cover 10 with the grip belt 17, the orientation of the notebook computer can be stabilized when the user operates the notebook computer while grasping it by inserting the hand in the grip belt 17.

The second housing 2 of the present embodiment includes the first engagement hole 2e and the second engagement hole 2f. The protection cover 10 of the present embodiment includes the first support member 12 and the second support member 13. Further, the first coupling member 20 of the present embodiment can be engaged with the first engagement hole 2e and held slidably by the first support member 12. Further, the second coupling member 30 of the present embodiment can be engaged with the second engagement hole 2f and held slidably by the second support member 13. With this configuration, when the second housing 2 is turned in the direction indicated by the arrow A or B shown in FIG. 1, it is possible to change the relative position between the second housing 2 and the protection cover 10, whereby the protection cover 10 can be prevented from loosening significantly near the hinge portions 3. Assuming that the protection cover 10 is fixed to the first housing 1 and the second housing 2, there is a high possibility that a part of the protection cover 10 facing the hinge portions 3 loosens significantly when the second housing 2 is turned and the notebook computer is shifted to the state shown in FIG. 17B. If such looseness occurs near the hinge portions 3, the orientation of the notebook computer to which the protection cover 10 is attached becomes unstable when the computer is placed on the desk surface, etc. In the present embodiment, as shown in FIGS. 17B and 17C, since the part of the protection cover 10 facing the hinge portions 3 does not loosen significantly, the orientation of the notebook computer to which the protection cover 10 is attached is stable even when the computer is placed on the desk surface, etc. Further, since no large looseness is present in the part of the protection cover 10 facing the hinge portions 3, it is possible to grasp the notebook computer in a stable orientation when the user grasps near the third outer face portion 11h of the protection cover 10 by inserting the hand in the grip belt 17.

According to the present embodiment, by providing the protection cover 10 with the third inner face portion 11d and the third outer face portion 11h, the hinge portions 3 and vicinities of the hinge portions 3 in the notebook computer can be protected. In the hinge portions 3 and the vicinities thereof in the notebook computer, mechanical components such as the hinge mechanisms and signal lines for transmitting signals between the display device 4 and an electric circuit board housed in the first housing 1 are arranged, and they are mechanically and electrically weak portions. In the present embodiment, by protecting the hinge portions 3 and the vicinities thereof from impacts or the like using the protection cover 10, it is possible to avoid damage to the mechanical components and disconnection of the signal lines.

Figure 18:
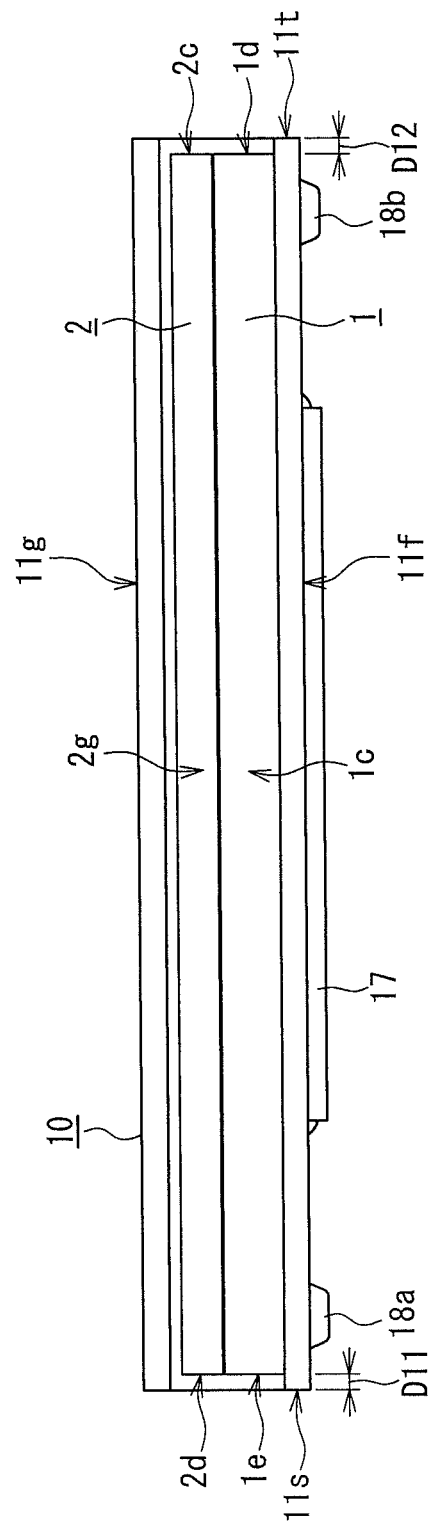
FIG. 18 is a side view of the notebook computer seen from a direction indicated by an arrow S in FIG. 17A.

According to the present embodiment, in the closed state of the notebook computer as shown in FIGS. 17A and 18, the edge portion 11s of the protection cover 10 protrudes further than a left side face 1e of the first housing 1 and the left side face 2d of the second housing 2, the edge portion 11t of the protection cover 10 protrudes further than a right side face 1d of the first housing 1 and the right side face 2c of the second housing 2, and the edge portions 11u and 11v of the protection cover 10 protrude further than the front face 1c of the first housing 1 and the front face 2g of the second housing 2. Therefore, when the notebook computer is dropped on the floor or the like, the protection cover 10 contacts the floor earlier than the notebook computer, whereby the notebook computer can be protected. FIG. 18 is a side view of the notebook computer seen from the direction indicated by the arrow S in FIG. 17A.

According to the present embodiment, by providing the first outer edge portion 11f of the protection cover 10 with the grip belt 17, the user can hold the notebook computer to which the protection cover 10 is attached by one hand by inserting the hand in the grip belt 17. Further, in the case where the notebook computer to which the protection cover 10 is attached is dropped on the floor or the like with the first outer edge portion 11f of the protection cover 10 facing vertically downward, the grip belt 17 may collide with the floor earlier than the protection cover 10. Thereby, impacts to be transmitted to the protection cover 10 and the notebook computer can be reduced. Note here that it is not essential to provide the protection cover 10 with the grip belt 17.

According to the present embodiment, by providing the first outer face portion 11f of the protection cover 10 with the raised portions 18a-18d, the orientation of the notebook computer to which the protection cover 10 is attached can be stabilized when the computer is used on the desk surface, etc. Further, in the case where the notebook computer to which the protection cover 10 is attached is dropped on the floor or the like with the first outer edge portion 11f of the protection cover 10 facing vertically downward, the raised portions 18a-18d may collide with the floor earlier than the protection cover 10. Thereby, impacts to be transmitted to the protection cover 10 and the notebook computer can be reduced. Note here that it is not essential to provide the protection cover 10 with the raised portions 18a-18d.

In the present embodiment, at the time of fixing the first housing 1 to the protection cover 10, the notebook computer is slid from the position shown in FIG. 9A to the direction indicated by the arrow G so that the first positioning hole 51 and the second positioning hole 52 are engaged with the first protrusion member 14 and the second protrusion member 15, respectively. However, the sliding direction of the notebook computer is not limited hereto as long as the direction is the plane direction of the first inner face portion 11b of the protection cover 10.

The positions of the first protrusion member 14, the second protrusion member 15, the first positioning hole 51 and the second positioning hole 52 shown in FIG. 9A are examples. Preferably, the first protrusion member 14, the second protrusion member 15 and the hole 16 are arranged near the edge portions 11s, 11t and 11u of the first inner face portion 11b of the protection cover 10. Further, preferably, the first positioning hole 51, the second positioning hole 52 and the screw hole 53 are arranged near the front face 1c, the right side face 1d and the left side face 1e in the lower face 1b of the first housing 1. By adopting the above-described preferable arrangement, the edge portion of the protection cover 10 is not spaced significantly from the first housing 1 due to the own weight, etc., whereby the notebook computer can be protected from disturbances reliably.

Further, in the present embodiment, in the first positioning hole 51 and the second positioning hole 52, the shapes of the holes into which the tip end portion 14a of the first protrusion member 14 and the tip end portion 15a of the second protrusion member 15 are inserted are circular (the circular holes 51a and 52a shown in FIG. 7A). However, the shapes thereof are not limited to circles as long as at least the tip end portion 14a of the first protrusion member 14 and the tip end portion 15a of the second protrusion member 15 can be inserted therein.

Further, although in the present embodiment the tip end portion 14a of the first protrusion member 14 and the tip end portion 15a of the second protrusion member 15 are circular in the plan view (see FIG. 5A), the shapes thereof are not limited to circles. The shapes of the tip end portions 14a and 15a in the plan view are only required to be capable of being inserted into the circular hole 51a of the first positioning hole 51 and the circular hole 52a of the second positioning hole 52 and not to be detached from the slot 51b of the first positioning hole 51 and the slot 52b of the second positioning hole 52. In the present embodiment, in order to satisfy the above-described conditions, the outer diameter R1 of the tip end portion 14a of the first protrusion member 14 (see FIG. 5A), the inner diameter R11 of the circular hole 51a of the first positioning hole 51 (see FIG. 7B) and the width dimension R12 of the slot 51b of the first positioning hole 51 (see FIG. 7B) have the following relationship.

$$R12<R1<R11$$

Further, preferably, the inner diameters R11 (see FIG. 7B) of the circular hole 51a in the first positioning hole 51 and the circular hole 52a in the second positioning hole 52 are sufficiently larger than the outer diameters R1 (see FIGS. 5A and 5B) of the tip end portion 14a of the first protrusion member 14 and the tip end portion 15a of the second protrusion member 15. With this configuration, at the time of fixing the first housing 1 to the protection cover 10, it is possible easily to insert the first protrusion member 14 and the second protrusion member 15 into the first positioning hole 51 and the second positioning hole 52, respectively. In other words, at the time of inserting the first protrusion member 14 and the second protrusion member 15 into the first positioning hole 51 and the second positioning hole 52, respectively, the first protrusion member 14, the second protrusion member 15, the first positioning hole 51 and the second positioning hole 52 are hidden by the first housing 1 and the protection cover 10, which makes it difficult to visually insert the protrusion members into the corresponding positioning holes. Therefore, by setting the inner diameters R11 of the circular holes 51a and 52a to be sufficiently larger than the outer diameters R1 of the tip end portions 14a and 15a, the protrusion members can be inserted easily into the corresponding positioning holes even without seeing them.

Further, although in the present embodiment the electronic device includes the first housing 1 and the second housing 2, the device may be composed of a single housing. In that case, the present application is realized by providing the protection cover with the first protrusion member 14, the second protrusion member 15 and the hole 16 and by providing the single housing with the first positioning hole 51, the second positioning hole 52 and the screw hole 53.

Further, the present embodiment illustrates and explains the states in which the notebook computer is closed, the first housing 1 is opened about 90 degrees with respect to the second housing 2, and the first housing 1 is opened about 110 degrees with respect to the second housing 2. However, the notebook computer can be opened 110 degrees or more, with the protection cover attached thereto. The first housing 1 can be opened up to about 180 degrees with respect to the second housing 2, with the protection cover of the present embodiment attached to the notebook computer.

Further, although in the present embodiment the notebook computer is given as an example of the device to which the protection cover 10 is attachable/detachable, any device that at least includes a plurality of openable/closable housings is applicable. For example, the protection cover 10 can be applied to a portable game machine, a mobile telephone, a portable medical device, etc.

Further, the first housing 1 in the present embodiment is an example of the housing or the first housing. The second housing 2 in the present embodiment is an example of the second housing. The protection cover 10 in the present embodiment is an example of the protection cover. The main body portion 11 in the present embodiment is an example of the main body portion. The first protrusion member 14, the second protrusion member 15 and the screw 54 in the present embodiment are examples of the fixing members. The first coupling member 20 and the second coupling member 30 in the present embodiment are examples of the locking members. The first positioning hole 51 and the second positioning hole 52 in the present embodiment are examples of the holes. The first protrusion member 14 and the second protrusion member 15 in the present embodiment are examples of the protrusion portions. The circular holes 51a and 52a in the present embodiment are examples of the first holes. The slots 51b and 52b in the present embodiment are examples of the second holes. The tip end portions 14a and 15a in the present embodiment are examples of the tip end portions. The shaft portions 14b and 15b in the present embodiment are examples of the shaft portions.

The present application is useful for a protection cover and an electronic device to which the protection cover is attachable/detachable. The present application relates to a cover holding structure.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A protection cover that covers at least a part of an electronic device having a first housing and a second housing that are supported turnably to each other, comprising:
    a main body portion having a size capable of covering the first housing and the second housing;
    a fixing member provided on the main body portion and capable of being fixed to the first housing; and
    a support member that is provided on the main body portion and capable of being locked to the second housing via a coupling member,
    wherein the coupling member locks the main body portion to the second housing such that a relative position between the main body portion and the second housing is changeable,
    the support member has a ring shape and in use has a predetermined space from a side surface of the second housing,
    the coupling member is attachable/detachable with respect to the side surface of the second housing and the coupling member has a sliding member with a hollow columnar shape, and
    the support member is disposed within the sliding member such that an inner surface of the sliding member is slideable on an outer surface of the support member when the second housing rotates relative to the first housing.

2. The protection cover according to claim 1, wherein the coupling member is locked to the second housing such that the relative position between the main body portion and the second housing is changeable in a plane direction of a main surface of the main body portion.

3. The protection cover according to claim 1, wherein the first housing and the second housing respectively include a keyboard and a display portion, and when the second housing is turned relative to the first housing, the protection cover slides relative to the second housing and part thereof protrudes from the second housing.

4. A protection cover that covers at least a part of an electronic device having a first housing and a second housing that are supported turnably to each other, the first housing and the second housing respectively including a keyboard and a display portion, comprising:
    a main body portion having a size capable of covering the first housing having the keyboard and the second housing having the display portion;
    a fixing member provided on the main body portion and capable of being fixed to the first housing; and
    a support member that is provided on the main body portion and capable of being locked to the second housingember,
    wherein the coupling member locks the main body portion to the second housing such that a relative position between the main body portion and the second housing is changeable in a direction parallel to a rotational trajectory plane of the second housing relative to the first housing,
    the support member has a ring shape and in use has a predetermined space from a side surface of the second housing,
    the coupling member is attachable/detachable with respect to the side surface of the second housing and the coupling member has a sliding member with a hollow columnar shape, and
    the support member is disposed within the sliding member such that an inner surface of the sliding member is slideable on an outer surface of the support member when the second housing rotates relative to the first housing.

5. An electronic device, comprising:
    a first housing including a keyboard;
    a second housing rotatably attached to the first housing, the second housing including a display portion;
    a protection cover that includes:
        a main body portion covering the first housing and the second housing;
        a fixing member provided on the main body portion and being fixed to the first housing;
        a support member that is provided on the main body portion and that is locked to the second housing via a coupling member, wherein the coupling member locks the main body portion to the second housing such that a relative position between the main body portion and the second housing is changeable; and
        the protection cover slides relative to the second housing when the second housing is rotated relative to the first housing, and part of the protection cover protrudes from the second housing,
    the support member has a ring shape and has a predetermined space from a side surface of the second housing,
    the coupling member is attachable/detachable with respect to the side surface of the second housing and the coupling member has a sliding member with a hollow columnar shape, and
    the support member is disposed within the sliding member such that an inner surface of the sliding member is slideable on an outer surface of the support member when the second housing rotates relative to the first housing.

6. The electronic device according to claim 5, wherein the coupling member is locked to the second housing such that the relative position between the main body portion and the second housing is changeable in a plane direction of a main surface of the main body portion.

7. An electronic device, comprising:
- a first housing including a keyboard;
- a second housing rotatably attached to the first housing, the second housing including a display portion;
- a protection cover that includes:
    - a main body portion covering the first housing and the second housing;
    - a fixing member provided on the main body portion and being fixed to the first housing; and
    - a support member that is provided on the main body portion and that is locked to the second housing via a coupling member, wherein the coupling member locks the main body portion to the second housing such that a relative position between the main body portion and the second housing is changeable in a direction parallel to a rotational trajectory plane of the second housing relative to the first housing,
- the support member has a ring shape and has a predetermined space from a side surface of the second housing,
- the coupling member is attachable/detachable with respect to the side surface of the second housing and the coupling member has a sliding member with a hollow columnar shape, and
- the support member is disposed within the sliding member such that an inner surface of the sliding member is slideable on an outer surface of the support member when the second housing rotates relative to the first housing.

\* \* \* \* \*